(12) United States Patent
Goel et al.

(10) Patent No.: US 9,619,853 B2
(45) Date of Patent: *Apr. 11, 2017

(54) GPU-ACCELERATED PATH RENDERING

(71) Applicant: QUALCOMM Incorporated, San Diego, CA (US)

(72) Inventors: Vineet Goel, Winter Park, FL (US); Usame Ceylan, Orlando, FL (US)

(73) Assignee: QUALCOMM INCORPORATED, San Diego, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 13/787,363

(22) Filed: Mar. 6, 2013

(65) Prior Publication Data

US 2014/0043341 A1    Feb. 13, 2014

Related U.S. Application Data

(60) Provisional application No. 61/681,498, filed on Aug. 9, 2012, provisional application No. 61/713,377, filed (Continued)

(51) Int. Cl.
 *G06F 15/00* (2006.01)
 *G06T 1/00* (2006.01)
 *G06T 11/20* (2006.01)

(52) U.S. Cl.
 CPC ............. *G06T 1/00* (2013.01); *G06T 11/203* (2013.01); *G06T 2200/28* (2013.01)

(58) Field of Classification Search
 None
 See application file for complete search history.

(56) References Cited

U.S. PATENT DOCUMENTS

| 7,190,367 B2 | 3/2007 | Perry et al. |
| 7,589,730 B1 | 9/2009 | Brown |

(Continued)

FOREIGN PATENT DOCUMENTS

| CN | 101114380 A | 1/2008 |
| CN | 101689306 A | 3/2010 |

(Continued)

OTHER PUBLICATIONS

Conversy et al., "The svgl toolkit: enabling fast rendering of rich 2D graphics" Technical Report—Ecole Des Mines De Nantes, 2002, 11 pp.

(Continued)

*Primary Examiner* — Frank Chen
(74) *Attorney, Agent, or Firm* — Shumaker & Sieffert, P.A.

(57) ABSTRACT

This disclosure is directed to techniques for performing GPU-accelerated path rendering. A GPU is described that is configured to receive data indicative of a path segment of a path to be rendered, tessellate the path segment into a plurality of primitives, and render at least one of a fill area and a stroke area for the path segment based on the plurality of primitives. The techniques of this disclosure may be used to improve the performance of path rendering operations, to reduce memory bandwidth requirements needed to perform path rendering operations, and/or to reduce the memory footprint needed to perform path rendering operations.

36 Claims, 15 Drawing Sheets

Related U.S. Application Data on Oct. 12, 2012, provisional application No. 61/755,312, filed on Jan. 22, 2013.

(56) References Cited

U.S. PATENT DOCUMENTS

| | | | |
|---|---|---|---|
| 7,684,641 | B1 | 3/2010 | Toksvig |
| 8,044,955 | B1 | 10/2011 | Yhann |
| 8,243,070 | B1 | 8/2012 | Brown |
| 9,275,498 | B2 | 3/2016 | Ceylan et al. |
| 9,330,495 | B2 | 5/2016 | Goel et al. |
| 2005/0195188 | A1 | 9/2005 | Goel et al. |
| 2006/0050072 | A1 | 3/2006 | Goel |
| 2007/0211061 | A1 | 9/2007 | Kokojima |
| 2008/0198168 | A1 | 8/2008 | Jiao et al. |
| 2009/0237401 | A1 | 9/2009 | Wei et al. |
| 2010/0289802 | A1 | 11/2010 | Falchetto |
| 2011/0057931 | A1 | 3/2011 | Goel et al. |
| 2011/0090228 | A1 | 4/2011 | Persson |
| 2011/0142360 | A1 | 6/2011 | Takemoto |
| 2011/0285711 | A1 | 11/2011 | Kilgard |
| 2011/0285718 | A1* | 11/2011 | Kilgard ............... G06T 11/203 345/442 |
| 2011/0285720 | A1 | 11/2011 | Kilgard |
| 2011/0285724 | A1* | 11/2011 | Kilgard ............... G06T 11/203 345/443 |
| 2011/0285740 | A1 | 11/2011 | Kilgard |
| 2011/0285741 | A1 | 11/2011 | Kilgard |
| 2011/0285742 | A1 | 11/2011 | Kilgard et al. |
| 2011/0285747 | A1 | 11/2011 | Kilgard |
| 2011/0310102 | A1 | 12/2011 | Chang |
| 2012/0075310 | A1 | 3/2012 | Michail et al. |
| 2012/0293515 | A1 | 11/2012 | Clarberg et al. |
| 2013/0120391 | A1* | 5/2013 | Brown ............................ 345/441 |
| 2013/0162651 | A1 | 6/2013 | Martin et al. |

FOREIGN PATENT DOCUMENTS

| | | |
|---|---|---|
| CN | 101978393 | 2/2011 |
| EP | 2107528 A1 | 10/2009 |
| JP | 2011510396 A | 3/2011 |
| JP | 2011238213 A | 11/2011 |
| WO | 2011080776 A1 | 7/2011 |

OTHER PUBLICATIONS

Figueiredo, "IV.4 Adaptive Sampling of Parametric Curves" Graphics Gems V, 1995, pp. 173-178.

Hexadecimal "GPU Experiments: Tessellation example", Feb. 19, 2010, Retrieved from the Internet: URL: http://gpuexperiments.blogspot.de/2010/02/tessellation-example.html, 4 pp.

International Search Report and Written Opinion—PCT/US2013/049775, International Search Authority—European Patent Office, Nov. 11, 2013, 12 pp.

Kilgard, et al., "GPU-accelerated Path Rendering", Computer Graphics Proceedings, SIGGraph Asia, 2012, pp. 1-10.

Segal M., et al., "The OpenGL Graphics System: A Specification", Chapter 11: Programmable Vertex Processing, Version 4.3 (Core Profile), Aug. 6, 2012, 49 pp.

U.S. Appl. No. 13/841,407, filed Mar. 15, 2013, by Goel et al.

U.S. Appl. No. 13/841,637, filed Mar. 15, 2013, by Ceylan et al.

Loop et al., "Resolution Independent Curve Rendering using Programmable Graphics Hardware," Jul. 2005 Transactions on Graphics (TOG), vol. 24 Issue 3, Siggraph 2005, 10 pp.

"OpenGL Programming Guide: The Official Guide to Learning OpenGL, Version 1.1, Chapter 14," Jan. 1, 1997, 21 pp.

Peters, "Mid-Structures Linking Curved and Piecewise Linear Geometry," In Proceedings of SIAM conference, Nov. 2004, 16 pp.

Yeo, et al., "Efficient Pixel-Accurate Rendering of Curved Surfaces," In Proceedings of I3D'12 (2012), Mar. 9-11, 2012, 9 pp.

Zink et al., "Practical Rendering & Computation with Direct3D 11," Overview of Direct 3D, CRC Press, Nov. 2, 2011, pp. 4-7.

Rice, et al., "Open VG Specification," Version 1.1, Dec. 3, 2008, retrieved from www.khronos.org/registry/vg/specs/openvg-1.1.pdf, 253 pp.

Second Written Opinion from International Application No. PCT/US2013/049775, dated Jul. 22, 2014, 7 pp.

Kilgard M.J., "An Introduction to NV_path_rendering", NVIDIA Corporation, Jun. 8, 2011, 81 pp.

Nvidia Corporation: "NV_path_rendering Frequently Asked Questions", Jun. 13, 2011, pp. 1-15.

International Preliminary Report on Patentability—PCT/US20131049775, The International Bureau of WIPO—Geneva, Switzerland, Nov. 7, 2014, 8 pp.

"Graphics Pipeline," Windows, Dev Center—Desktop, retrieved on Sep. 9, 2014, from http://msdn.microsoft.com/en-us/enus/%20library/windows/desktop/ff476882%28v=vs.85%29.aspx, 2 pp.

Liland I.L, "Path Rasterizer for OpenVG", Jun. 2007, Norwegian University of Science and Technology, 171 pps.

McGuire, et al., "Hardware-determined feature edges," Proceedings of the 3rd international symposium on Non-photorealistic animation and rendering,NPAR, Mar. 2004 pp. 35-47.

Rougier N, "Shader-Based Antialiased Dashed Stroked Polylines," Journal of Computer Graphics Techniques, 2013, 18 Pages.

* cited by examiner

GPU-ACCELERATED PATH RENDERING

This application claims the benefit of U.S. Provisional Application No. 61/755,312, filed Jan. 22, 2013, U.S. Provisional Application No. 61/713,377, filed Oct. 12, 2012, and U.S. Provisional Application No. 61/681,498, filed Aug. 9, 2012 the entire content of each of which is incorporated herein by reference.

TECHNICAL FIELD

This disclosure relates to graphics processing, and more particularly, to techniques for path rendering.

BACKGROUND

Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG™) API.

Path rendering may be implemented in a central processing unit (CPU). However, such an approach may be CPU-intensive, and may therefore limit the amount of CPU processing cycles available for other CPU tasks. Moreover, in some cases, a relatively large amount of data may need to be transferred to a graphics processing unit (GPU) to render the path segment at a desired level of detail. The relatively large amount of data may consume a significant amount of memory storage space when storing the data, and may consume a significant amount of memory bandwidth when transferring the data to the GPU.

SUMMARY

This disclosure is directed to techniques for performing GPU-accelerated path rendering. A GPU designed in accordance with the GPU-accelerated path rendering techniques of this disclosure may be configured to tessellate a received path segment into a plurality of primitives (e.g., a plurality of line segments), and to render at least one of a fill area and a stroke area for the path segment based on the plurality of primitives. The techniques of this disclosure may provide partial-to-total GPU hardware acceleration for the execution of one or more path rendering operations, such as, e.g., path filling operations and path stroking operations.

In one example, this disclosure describes a method that includes receiving, with a GPU, data indicative of a path segment of a path to be rendered. The method further includes tessellating, with the GPU, the path segment into a plurality of primitives. The method further includes rendering, with the GPU, at least one of a fill area and a stroke area for the path segment based on the plurality of primitives.

In another example, this disclosure describes a device that includes a GPU configured to receive data indicative of a path segment of a path to be rendered. The GPU is further configured to tessellate the path segment into a plurality of primitives. The GPU is further configured to render at least one of a fill area and a stroke area for the path segment based on the plurality of primitives.

In another example, this disclosure describes an apparatus that includes means for receiving data indicative of a path segment of a path to be rendered. The apparatus further includes means for tessellating the path segment into a plurality of primitives. The apparatus further includes means for rendering at least one of a fill area and a stroke area for the path segment based on the plurality of primitives.

In another example, this disclosure describes a computer-readable storage medium storing instructions that, when executed, cause one or more processors to receive data indicative of a path segment of a path to be rendered. The computer-readable storage medium further stores instructions that, when executed, cause the one or more processors to tessellate the path segment into a plurality of primitives. The computer-readable storage medium further stores instructions that, when executed, cause the one or more processors to render at least one of a fill area and a stroke area for the path segment based on the plurality of primitives.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
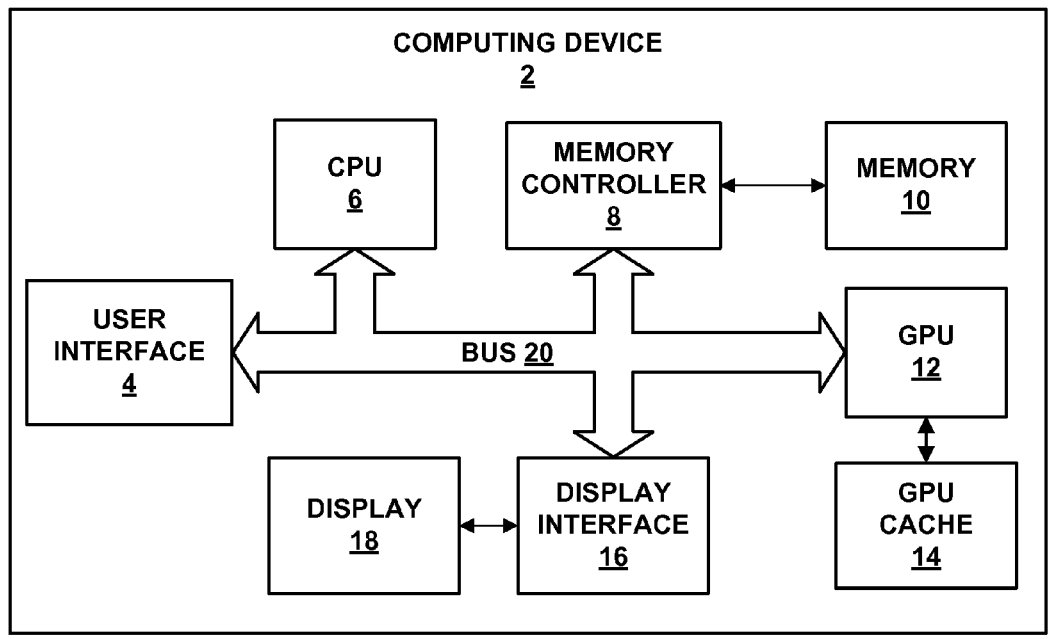
FIG. 1 is a block diagram illustrating an example computing device that may be used to implement the GPU-accelerated path rendering techniques of this disclosure.

This disclosure is directed to techniques for performing GPU-accelerated path rendering. Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG™) API.

GPUs typically implement a three-dimensional (3D) graphics pipeline that is designed to be compliant with one or more 3D graphics APIs. Because the prevailing 3D graphics APIs in use today do not require that compliant devices support path rendering commands, modern GPUs often provide little to no hardware acceleration for path rendering commands. For example, a typical 3D graphics pipeline implemented in a modern GPU may include a rasterizer that is designed to rasterize low-order, non-curved, 3D graphics primitives (such as, e.g., points, lines and triangles), but is not capable of directly rendering curved path rendering primitives (such as, e.g., elliptic arcs and Bézier curves).

One approach for path rendering may involve using a 3D GPU pipeline to provide partial GPU hardware acceleration for the execution of path rendering commands. This approach involves preprocessing a path segment with a central processing unit (CPU) in order to convert the path segment into one or more low-order, non-curved, 3D graphics primitives that can be rasterized by the GPU. For example, a CPU may tessellate a curved path segment (e.g., an elliptical arc or a Bézier curve) into a set of relatively small triangles that approximates the curvature of the path segment, and may cause the set of triangles to be rendered using the GPU. Such an approach, however, may be CPU-intensive, and may therefore limit the amount of CPU processing cycles available for other CPU tasks. Moreover, in some cases, a relatively large amount of triangles may be needed to render the path segment at a desired level of detail. The relatively large amount of triangles may consume a significant amount of memory storage space when storing the data, and may consume a significant amount of memory bandwidth when transferring the data to the GPU.

Another approach for providing partial-to-total GPU hardware acceleration for the execution of path rendering commands may involve modifying the architecture of the GPU to support a dedicated, hardware-accelerated, path rendering pipeline. However, because the prevailing 3D graphics APIs (e.g., the Microsoft® DirectX® 11 (DX) API) do not require a GPU architecture to include a dedicated path rendering pipeline, such an approach does not result in a cross-platform, hardware-accelerated, path rendering solution that would be guaranteed to be supported by all GPUs which are compliant with a particular 3D graphics API (e.g., the DX 11 API).

The path rendering techniques in this disclosure may provide a GPU hardware-accelerated path rendering solution where the GPU is configured to tessellate a received path segment into a plurality of line segments, and to render the tessellated line segments using a 3D graphics pipeline. By using the GPU to tessellate a path segment into line segments, the burden of preprocessing path segments is lifted from the CPU, thereby freeing up processing resources for other CPU tasks. Moreover, the GPU may, in some examples, utilize a highly-parallel, modern GPU tessellation architecture to perform the tessellation operations, which may, in some examples, allow the GPU to render a path segment in a more efficient manner than the CPU. In addition, because the tessellation occurs in the GPU, rather than in the CPU, a multitude of tessellated primitives do not need to be stored in system memory and do not need to be passed from the CPU to the GPU, thereby reducing the memory footprint needed for path rendering as well as the memory bandwidth needed for path rendering.

In some examples, a GPU designed in accordance with the techniques of this disclosure may be configured to tessellate and render a path segment using a graphics architecture that is specified by a particular 3D graphics API, such as, e.g., the DX 11 API, without requiring any additional hardware components and/or modifications to the graphics architecture. By utilizing only architectural features likely or guaranteed to be present by a particular 3D graphics API when performing path rendering in such examples, a cross-platform, hardware-accelerated, path rendering solution may be realized that is capable of being implemented on any device that is compliant with the 3D graphics API. For example, the techniques of this disclosure may, in some examples, provide a path rendering solution that is capable of being used on any DirectX® 11 compliant graphics hardware. In some examples, dashing and cusp handling may be disabled in order to implement a DirectX® 11 path rendering solution that utilizes the DirectX® 11 architecture without any modifications.

Path rendering may be divided into two main operations: (1) filling a path segment; and (2) stroking a path segment. In some examples, one or both of the filling and stroking operations may be performed to completely render a path. Conceptually, the filling operation may correspond to filling the interior region of a path segment with a specified fill color. The stroking operation may conceptually correspond to "widening" the edges of a path segment using a straight-line pen held perpendicularly to the path. In some examples, the stroking operation may also involve applying various types of end caps to the ends of a path and/or applying various types of joins between the endpoints of interior path segments of a path.

After a path segment has been tessellated, a GPU that implements the path rendering techniques of this disclosure may be configured to generate 3D geometry corresponding to the tessellated path segments that allows one or both of a fill area for the path segment and a stroke area for the path segment to be rendered by the GPU. The 3D geometry may include low-order, non-curved, 3D graphics primitives (e.g., triangles) that are capable of being rasterized by existing 3D rasterization engines. By rendering the fill areas and/or stroke areas for a path segment based on the 3D geometry that is generated by a GPU from a plurality of tessellated line segments that approximate a path to be rendered, a 3D GPU pipeline may be used to provide either a 100% or a nearly 100% GPU solution for the execution of filling and stroking operations.

FIG. 1 is a block diagram illustrating an example computing device 2 that may be used to implement the GPU-accelerated path rendering techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a GPU cache 14, a display interface 16, a display 18 and bus 20. User interface 4, CPU 6, memory controller 8, GPU 12 and display interface 16 may communicate with each other using bus 20. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES®) API, a Direct3D® API, a DirectX® API, a RenderMan® API, a WebGL™ API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, patches, etc. In further examples, the graphics data to be rendered may include one or more path rendering primitives, such as, e.g., line segments, elliptic arcs, quadratic Bézier curves, and cubic Bézier curves.

Memory controller 8 facilitates the transfer of data going into and out of memory 10. For example, memory controller 8 may receive memory read requests and memory write requests from CPU 6 and/or GPU 12, and service such requests with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from each of CPU 6, GPU 12, and memory 10, in other examples, some or all of the functionality of memory controller 8 may be implemented on one or more of CPU 6, GPU 12, and memory 10.

Memory 10 may store program modules and/or instructions that are accessible for execution by CPU 6 and/or data for use by the programs executing on CPU 6. For example, memory 10 may store user applications and graphics data associated with the applications. Memory 10 may also store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of path data, path segment data, surfaces, texture buffers, depth buffers, stencil buffers, vertex buffers, frame buffers, or the like. In addition, memory 10 may store command streams for processing by GPU 12. For example, memory 10 may store path rendering commands, 3D graphics rendering commands, and/or general-purpose GPU computing commands. Memory 10 may include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM), Flash memory, a magnetic data media or an optical storage media.

GPU 12 may be configured to execute commands that are issued to GPU 12 by CPU 6. The commands executed by GPU 12 may include graphics commands, draw call commands, GPU state programming commands, memory transfer commands, general-purpose computing commands, kernel execution commands, etc.

In some examples, GPU 12 may be configured to perform graphics operations to render one or more graphics primitives to display 18. In such examples, when one of the software applications executing on CPU 6 requires graphics processing, CPU 6 may provide graphics data to GPU 12 for rendering to display 18 and issue one or more graphics commands to GPU 12. The graphics commands may include, e.g., draw call commands, GPU state programming commands, memory transfer commands, blitting commands, etc. The graphics data may include vertex buffers, texture data, surface data, etc. In some examples, CPU 6 may provide the commands and graphics data to GPU 12 by writing the commands and graphics data to memory 10, which may be accessed by GPU 12.

In further examples, GPU 12 may be configured to perform general-purpose computing for applications executing on CPU 6. In such examples, when one of the software applications executing on CPU 6 decides to off-load a computational task to GPU 12, CPU 6 may provide general-purpose computing data to GPU 12, and issue one or more general-purpose computing commands to GPU 12. The general-purpose computing commands may include, e.g., kernel execution commands, memory transfer commands, etc. In some examples, CPU 6 may provide the commands and general-purpose computing data to GPU 12 by writing the commands and graphics data to memory 10, which may be accessed by GPU 12.

GPU 12 may, in some instances, be built with a highly-parallel structure that provides more efficient processing of vector operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 18 more quickly than rendering the images using CPU 6. In addition, the highly parallel nature of GPU 12 may allow GPU 12 to process certain types of vector and matrix operations for general-purposed computing applications more quickly than CPU 6.

GPU 12 may, in some examples, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within memory 10. The rendered image data may include rendered fill areas and stroke areas for a path segment to be rendered. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing.

Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computer device 2 via a wired or wireless communications link. For instance, display 18 may be a computer monitor or flat panel display connected to a personal computer via a cable or wireless link.

Bus 20 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 20 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to this disclosure, GPU 12 may be configured to provide partial-to-total GPU-hardware acceleration for the execution of various path rendering commands. For example, CPU 6 may issue one or more path rendering commands to GPU 12, and GPU 12 may execute the path rendering commands. As one example, CPU 6 may issue to GPU 12 one or more path filling commands that instruct GPU 12 to perform a path filling operation, and GPU 12 may execute the path filling commands. As another example, CPU 6 may issue to GPU 12 one or more path stroking commands that instruct GPU 12 to perform a path stroking operation, and GPU 12 may execute the path stroking commands.

In some examples, GPU 12 may be configured to receive data indicative of a path segment of a path to be rendered, tessellate the path segment into a plurality of primitives, and render at least one of a fill area and a stroke area for the path segment based on the plurality of primitives. The GPU may render a fill area for the path segment when performing a fill operation, and may render a stroke area for the path segment when performing a stroke operation. The plurality of primitives, in some examples, may be a plurality of line segments.

In some examples, GPU 12 may use a two-pass rendering approach to perform a path filling operation. For example, as part of a first rendering pass, GPU 12 may receive data indicative of a path segment of a path to be rendered, tessellate the path segment into a plurality of line segments, and generate a plurality of triangle primitives based on the plurality of line segments. GPU 12 may generate each of the plurality of triangle primitives based on a respective one of the plurality of line segments. GPU 12 may render each of the plurality of triangle primitives into a common stencil buffer such that the common stencil buffer stores data indicative of which pixels are inside of the fill area for the path segment. After rendering the primitives into the common stencil buffer, GPU 12 may perform a second rendering pass. During the second rendering pass, GPU 12 may render one or more primitives that encompass the pixels that are inside of the fill area for the path segment based on the data stored in the stencil buffer and a fill color in order to generate a rasterized version of the fill area for the path segment. In this manner, GPU 12 may provide GPU-hardware acceleration for the performance of path filling operations.

To generate the plurality of triangle primitives for the path filling operation, GPU 12 may, in some examples, generate a plurality of triangle primitives such that each of the triangle primitives has a common vertex that is the same for all of the triangle primitives generated for a path segment. In such examples, GPU 12 may generate the plurality of triangle primitives such that each of the triangle primitives has two additional vertices (i.e., two vertices in addition to the common vertex) that correspond to the endpoints of a respective one of the plurality of line segments. Each additional vertex may correspond to a respective one of the endpoints of a corresponding line segment.

To render each of the plurality of triangle primitives into a common stencil buffer, GPU 12 may use one of the following techniques. According to a first technique, GPU 12 may, for each of the plurality of triangle primitives, invert one or more values in the stencil buffer that correspond to the respective triangle primitive. According to a second technique, GPU 12 may, for each of the plurality of triangle primitives, increment one or more values in the stencil buffer that correspond to the respective triangle primitive if a vertex order for the respective triangle primitive is oriented in a clockwise direction, and decrement values in the stencil buffer that correspond to the respective triangle primitive if a vertex order for the respective triangle primitive is oriented in a counter-clockwise direction.

In some cases, GPU 12 may use one or both of the following techniques to perform the path filling operation. According to a first technique, GPU 12 may tessellate the path segment into a plurality of line segments using a fixed-function tessellation engine of GPU 12 and a domain shader program executing on a programmable shader unit of GPU 12. According to a second technique, GPU 12 may generate the plurality of triangle primitives using a geometry shader program executing on a programmable shader unit of GPU 12. Using one or more of the tessellation engine, the domain shader, and the geometry shader of GPU 12 to perform the path filling operation may allow the path filling operation to be performed, in some examples, using a GPU that is compliant with an on-chip, tessellation-enabled, 3D graphics API, such as, e.g., the DX 11 API, without requiring modification of the API or modification of the graphics architecture specified by the API.

In further examples, GPU 12 may use a single-pass rendering approach to perform a path stroking operation. For example, GPU 12 may receive data indicative of a path segment of a path to be rendered, tessellate the path segment into a plurality of line segments, and generate a plurality of triangle primitives that spatially correspond to a stroke area for the path segment based on the plurality of line segments. For each of the plurality of line segments, GPU 12 may generate one or more primitives (e.g., triangle primitives) that spatially correspond to a stroke area for the respective line segment, and render the one or more primitives for the respective line segment based on a stroke color to generate a rasterized version of the stroke area for the path segment. In this manner, GPU 12 may provide GPU-hardware acceleration for the performance of path stroking operations.

To generate one or more primitives (e.g., triangle primitives) that spatially correspond to a stroke area of a line segment, GPU 12 may, in some examples, generate a plurality of normal vectors for the respective line segment. Each of the normal vectors may be indicative of a direction that is perpendicular to a tangent of the path segment at a respective one of a plurality of points along the path segment. Each of the plurality of points along the path segment may correspond to a respective one of the endpoints of the respective line segment. GPU 12 may determine corner points of a stroke area for the respective line segment based on the plurality of normal vectors and a stroke width. GPU 12 may generate the one or more primitives that spatially correspond to the stroke area for the respective line segment based on the corner points of the stroke area.

In some cases, GPU 12 may use one or more of the following techniques to perform the path stroking operation. According to a first technique, GPU 12 may tessellate the path segment into a plurality of line segments using a fixed-function tessellation engine of GPU 12 and a domain shader program executing on a programmable shader unit of GPU 12. According to a second technique, GPU 12 may generate the one or more primitives using a geometry shader program executing on a programmable shader unit of GPU 12. According to a third technique, GPU 12 may generate the plurality of normal vectors using a domain shader program executing on a programmable shader unit of GPU 12. Using one or more of the tessellation engine, the domain shader, and the geometry shader of GPU 12 to perform the path stroking operation may allow the path stroking operation to be performed, in some examples, using a GPU that is compliant with an on-chip, tessellation-enabled, 3D graphics API, such as, e.g., the DX 11 API, without requiring modification of the API or modification of the graphics architecture specified by the API.

The path rendering techniques described in this disclosure may be implemented in any of the components of computing device 2 illustrated in FIG. 1 including, e.g., CPU 6, GPU 12, and memory 10. In some examples, all or almost all of the path rendering techniques may be implemented in GPU 12 (e.g., in a graphics pipeline of GPU 12). In additional examples, CPU 6 may implement techniques for configuring the state of the graphics pipeline and binding shader programs to the graphics pipeline to implement a path rendering pipeline in GPU 12 that performs the path rendering techniques of this disclosure. In further examples, CPU 6 may be configured to place data indicative of a path to be rendered into one or more buffers (e.g., one or more vertex buffers) that may be accessed by GPU 12 to render one or more paths.

Figure 2:
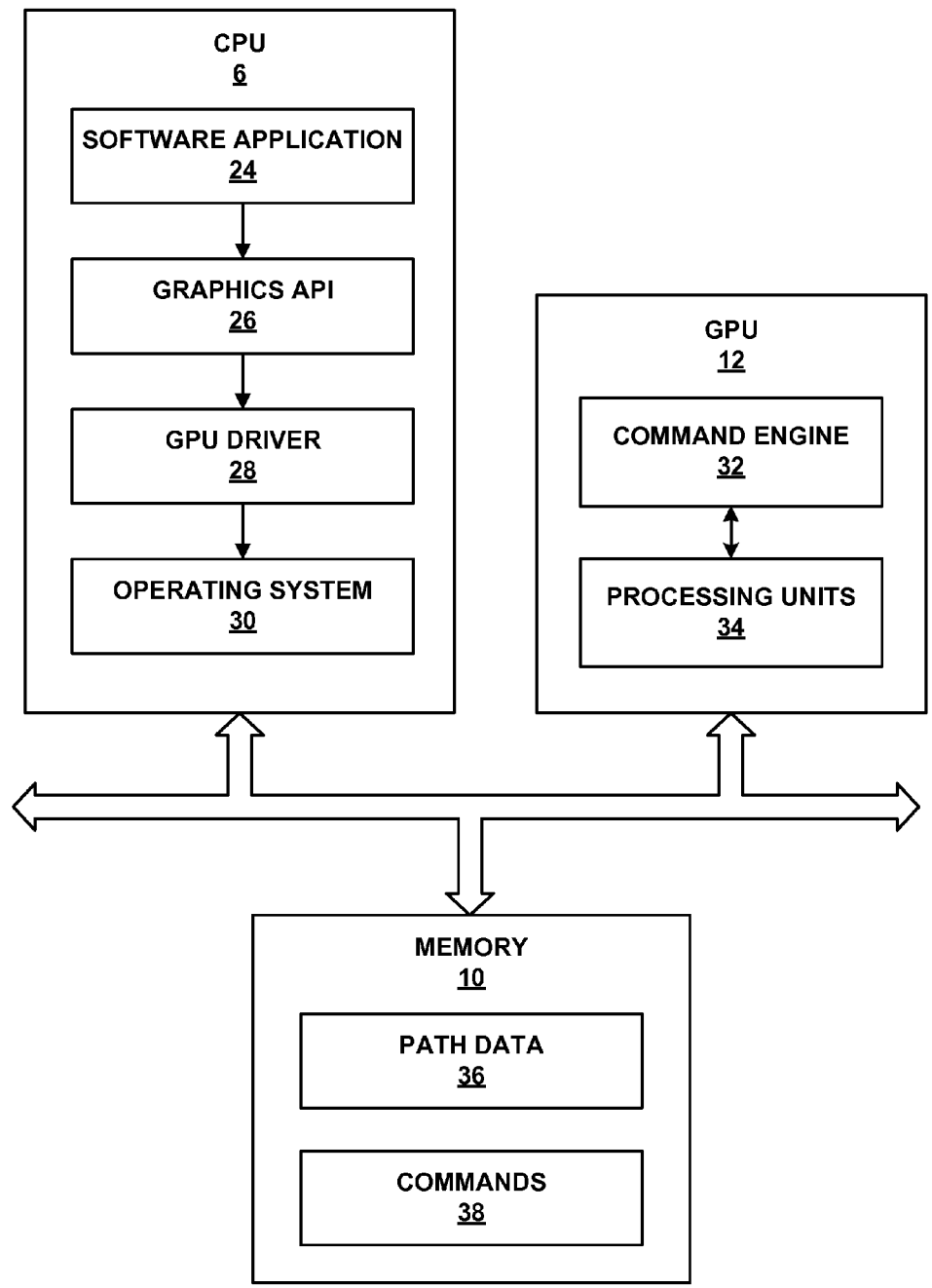
FIG. 2 is a block diagram illustrating the CPU, the GPU and the memory of the computing device in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 is configured to execute a software application 24, a graphics API 26, a GPU driver 28 and an operating system 30. Software application 24 may include one or more instructions that cause graphics images to be displayed and/or one or more instructions that cause a non-graphics task (e.g., a general-purposed computing task) to be performed on GPU 12. Software application 24 may issue instructions to graphics API 26. Graphics API 26 may be a runtime service that translates the instructions received from software application 24 into a format that is consumable by GPU driver 28. GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

GPU 12 includes a command engine 32 and one or more processing units 34. In some examples, the one or more processing units 34 may form and/or implement a 3D graphics rendering pipeline, e.g., a DX 11 graphics rendering pipeline (i.e., a 3D graphics pipeline that is compliant with the DX 11 graphics API).

Command engine 32 is configured to receive commands from CPU 6 (e.g., via memory 10) and to cause GPU 12 to execute the commands. In response to receiving a state command, command engine 32 may be configured to set one or more state registers in GPU 12 to particular values based on the state command, and/or to configure one or more of the fixed-function processing units 34 based on the state command. In response to receiving a draw call command, command engine 32 may be configured to cause processing units 34 to render one or more path segments based on data that defines the geometry of the one or more path segments to be rendered and based on data indicative of the type of path segment for each of the path segments to be rendered. In some examples, the data that defines the geometry of the one or more path segments to be rendered and the data that defines the type of path segment for each of the path segments may be stored in one or more vertex data structures in memory 10. Command engine 32 may also receive shader program binding commands, and load particular shader programs into one or more of the programmable processing units 34 based on the shader program binding commands.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL® Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, tessellation control shader units, tessellation evaluation shader units, compute shader units, and/or unified shader units.

A fixed-function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc.

Memory 10 may store path data 36 and one or more commands 38. In some examples, path data 36 may be stored as a plurality of vertices (or control points) in one or more vertex buffers allocated in memory 10. In some examples, the path data may be stored in a patch list data structure (e.g., a four control point patch list). Commands 38 may be stored in one or more command buffers (e.g., a ring buffer). CPU 6 (e.g., GPU driver 28 via operating system 30) may place path data 36 and commands 38 into memory 10 for consumption by GPU 12. GPU 12 (e.g., command engine 32) may retrieve and execute commands 38 stored in memory 10.

In examples where path data 36 is stored as vertices (e.g., control points), the vertices may include one or more attributes that geometrically define a path segment to be rendered. For example, for a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points instead of four control points. For elliptic arcs, the vertices in the patch control list may include data indicative of an endpoint parameterization of the elliptic arc or data indicative of a center parameterization of the elliptic arc.

In some cases, the one or more attributes that geometrically define the path segment to be rendered may be resolution-independent. In other words, the attributes that geometrically define the path segment may be independent of the amount of tessellation to be performed when rendering the path segment and/or independent of the amount of vertices to be generated when rendering the path segment.

CPU 6 may also place data indicative of the type of path segment to be rendered (i.e., a "path segment type indicator") into one or more otherwise unused vertex attributes in the vertex buffer. In some examples, the different path segment types may correspond to a set of path segment types that are defined by a vector graphics API and are available for use by software application 24. In some examples, the different path segment types may correspond to a set of path segment types that are defined by the OpenVG™ API.

Commands 38 may include one or more state commands and/or one or more draw call commands. A state command may instruct GPU 12 to change one or more of the state variables in GPU 12, such as, e.g., the draw color, the fill color, the stroke color, etc. In some examples, the state commands may include path rendering state commands that are configured to set one or more state variables associated with rendering a path. For example, the state commands may include a paint mode command that is configured to indicate whether a path to be rendered is to be filled, stroked, or both. As another example, the state commands may include a fill color command that specifies a color to be used for filling operations and/or a stroke color command that specifies a color to be used for stroking operations. As a further example, the state commands may specify one or more parameters for the stroke operation, such as, e.g., a stroke width, an end cap style (e.g., round, square), a line join style (e.g., miter, round, bevel), a miter limit, etc. In some examples, in addition to or in lieu of using a state command to set one or more state parameters, one or more of the state parameters may be set by using a draw call command or by placing state indicators into a vertex buffer that contains path data 36.

A draw call command may instruct GPU 12 to render the geometry defined by a group of one or more vertices (e.g., defined in a vertex buffer) stored in memory 10. In some examples, the draw call command may invoke GPU 12 to render all of the vertices stored in a defined section (e.g., a vertex buffer or path data 36) of memory 10. In other words, once GPU 12 receives the draw call command, control is passed to GPU 12 for rendering the geometry and primitives represented by the vertices in the defined section (e.g., vertex buffer or path data 36) of memory 10.

The draw call commands may include one or both of 3D draw call commands and path rendering draw call commands. For 3D rendering draw call commands, the geometry defined by the group of one or more vertices in the vertex buffer may correspond to one or more 3D graphics primitives to be rendered (e.g., points, lines, triangles, quadrilaterals, triangle strips, patches, etc.), and the 3D rendering draw call command may instruct GPU 12 to render the one or more 3D graphics primitives. For path rendering draw call commands, the geometry defined by the group of one or more vertices in the vertex buffer may correspond to one or more path primitives to be rendered (e.g., line segments, elliptic arcs, quadratic Bézier curves, and cubic Bézier curves, etc.), and the path rendering draw call command may instruct GPU 12 to render the one or more path primitives. In some examples, the path primitives capable of being rendered by GPU 12 may correspond to the different types of path segments described in this disclosure.

In some examples, the path rendering techniques described in this disclosure may be implemented in any of the components shown in FIG. 2 including, e.g., graphics API 26, GPU driver 28, command engine 32 and processing units 34. In further examples, all or almost all of the path rendering techniques may be implemented in a graphics pipeline in GPU 12 formed by processing units 34. In additional examples, software application 24, graphics API 26 and/or GPU driver 28 of CPU 6 may implement techniques for configuring the state of the graphics pipeline and binding shader programs to the graphics pipeline to implement a path rendering pipeline in GPU 12 that performs the path rendering techniques described in this disclosure. In further examples, software application 24, graphics API 26 and/or GPU driver 28 of CPU 6 may be configured to place data indicative of a path to be rendered into one or more buffers (e.g., one or more vertex buffers) that may be accessed by GPU 12 to render one or more paths.

Figure 3:
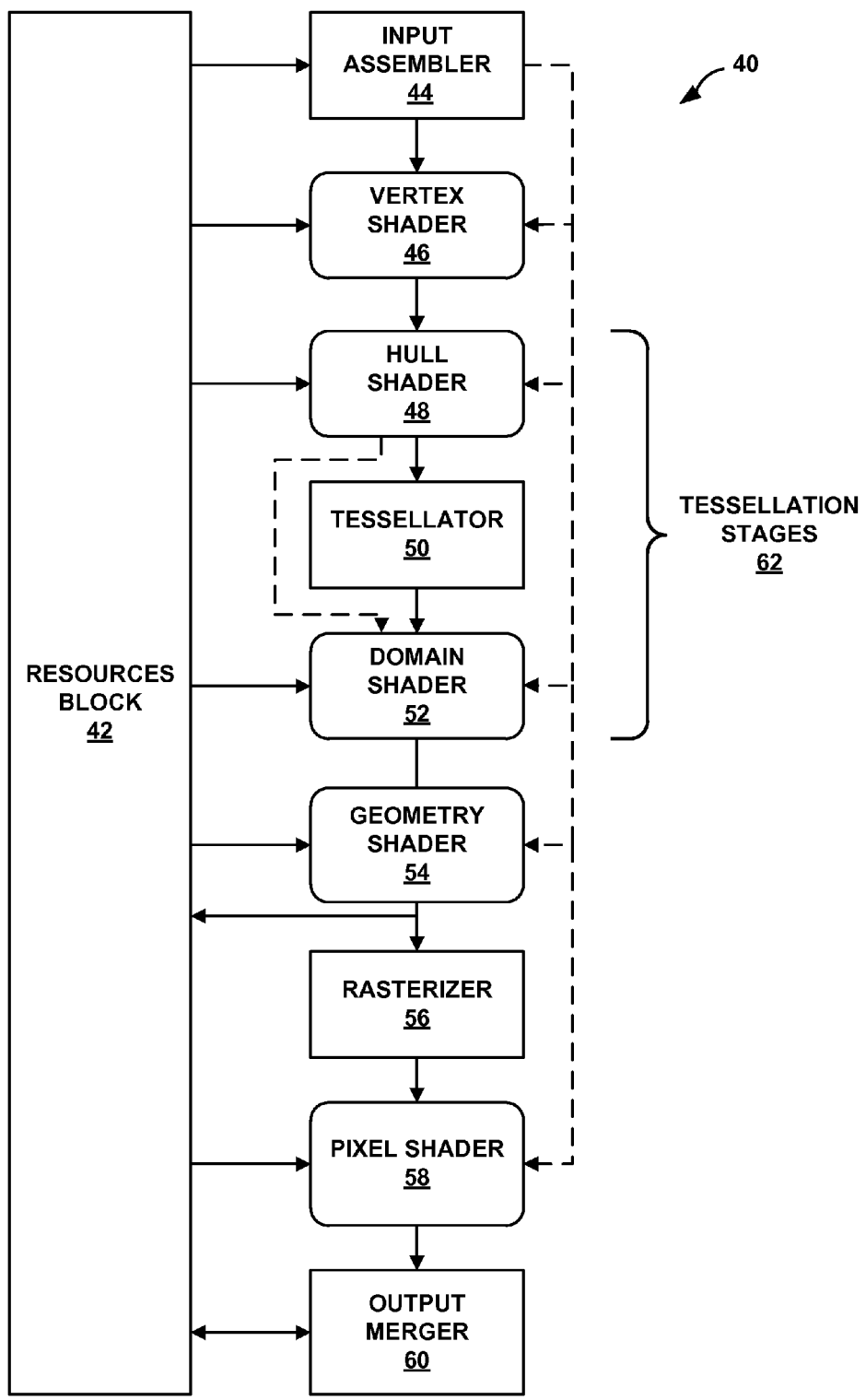
FIG. 3 is a conceptual diagram illustrating an example graphics pipeline that may perform the GPU-accelerated path rendering techniques of this disclosure.

FIG. 3 is a conceptual diagram illustrating an example graphics pipeline 40 that may perform the path rendering techniques of this disclosure. In some examples, the graphics pipeline may correspond to a Microsoft® DirectX® (DX) 11 graphics pipeline. As shown in FIG. 3, graphics pipeline 40 includes a resources block 42 and a plurality of processing stages. The plurality of processing stages include an input assembler (IA) 44, a vertex shader (VS) 46, a hull shader (HS) 48, a tessellator 50, a domain shader (DS) 52, a geometry shader (GS) 54, a rasterizer 56, a pixel shader (PS) 58, and an output merger 60. Hull shader 48, tessellator 50, and domain shader 52 may form the tessellation stages 62 of graphics pipeline 40.

Resources block 42 may correspond to one or more memory resources used by graphics pipeline 40, such as, e.g., one or more textures and/or one or more buffers. Resources block 42 may store input data to be processed by one or more of the processing stages in graphics pipeline 40 and/or output data from one or more of the processing stages in graphics pipeline 40. As one example, resources block 42 may store a stencil buffer used for performing a path filling operation as described in this disclosure. As another example, resources block 42 may store a frame buffer that holds a rasterized version of a fill area for a path segment and/or a rasterized version of a stroke area for a path segment as described in this disclosure. In some examples, the memory resources that form resources block 42 may reside in memory 10 and/or GPU cache 14 of computing device 2.

The processing stages depicted in FIG. 3 with straight corners represent fixed-function processing stages, and the processing stages depicted in FIG. 3 with rounded corners represent programmable processing stages. For example, as shown in FIG. 3, input assembler 44, tessellator 50, rasterizer 56 and output merger 60 are fixed-function processing stages, and vertex shader 46, hull shader 48, domain shader 52, geometry shader 54 and pixel shader 58 are programmable processing stages. Each of the programmable stages may be configured to execute a shader program of a particular type. For example, vertex shader 46 may be configured to execute a vertex shader program, hull shader 48 may be configured to execute a hull shader program, etc. Each of the different types of shader programs may execute either on a common shader unit of GPU 12 or on one or more dedicated shader units that are dedicated to executing shader programs of one or more particular types.

As shown in FIG. 3, input assembler 44, vertex shader 46, hull shader 48, domain shader 52, geometry shader 54, pixel shader 58 and output merger 60 are communicatively coupled to resources block 42. Input assembler 44, vertex shader 46, hull shader 48, domain shader 52, geometry shader 54, pixel shader 58 and output merger 60 are configured to retrieve and/or to receive input data from resources block 42. Geometry shader 54 and output merger 60 are configured to write output data to resources block 42. The above-described configuration of communication between the processing stages in graphics pipeline 40 and resources block 42 is merely one example of how the communication may be configured between the processing stages of graphics pipeline 40 and resources block 42. In other examples, more or less uni-directional and/or bi-directional communication channels may be provided between the processing stages of graphics pipeline 40 and resources block 42.

Additional background information regarding the general operation of the DirectX® 11 graphics pipeline may be found in "Graphics Pipeline," Programming Guide for Direct3D 11, Windows, Dev Center—Desktop, the entire content of which is incorporated herein by reference. Further information regarding the general operation of the DirectX® 11 graphics pipeline may be found in Zink et al., "Practical Rendering & Computation with Direct3D® 11," CRC Press (2011), the entire content of which is incorporated herein by reference.

As discussed above, the two main path rendering operations are: (1) filling a path segment; and (2) stroking a path segment. Solutions for performing each of these operations with graphics rendering pipeline 40 (e.g., the DirectX® 11 graphics pipeline) will now be described.

The filling operation may utilize a two-pass approach that may generally involve the following steps:

Pass 1
1. Tessellate a path segment into a plurality of line segments.
2. Generate a triangle primitive for every line segment.
3. Render all of the triangle primitives into a stencil buffer.

Pass 2
4. Render a bounding box for the path segment using the stencil buffer.

For the first pass, CPU 6 may place data indicative of a path segment to be rendered into one or more vertices of a vertex buffer. In some examples, the vertex buffer may correspond to path data 36 shown in FIG. 2. The primitive topology for the vertices in the vertex buffer may be, in some examples, a patch control list. For a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points that define the curve instead of four control points. For elliptic arcs, the vertices in the patch control list may include data indicative of an endpoint parameterization of the elliptic arc or data indicative of a center parameterization of the elliptic arc. CPU 6 may also place data indicative of the type of path segment to be rendered into an otherwise unused vertex attribute of the patch control list.

One example format for the path data 36 received and used by GPU 12 to perform path rendering will now be described. It should be understood that this is merely one example of how data indicative of a path to be rendered and/or a path segment to be rendered may be provided by CPU 6 to GPU 12 and that other examples are possible and within the scope of this disclosure. In this example, GPU 12 receives each path segment as a four (4) control point patch list primitive. Each of the vertices (e.g., control points) in the patch list, in this example, includes three (3) float attributes that define attributes for the respective vertex (e.g., control point).

For a line path segment, the input path data may take the following form or a similar form:

| { XMFLOAT3( | X0, | Y0, 2.0f ) }, |
| { XMFLOAT3( | X1, | Y1, 1.0f ) }, |
| { XMFLOAT3( | 0.0f, | 0.0f, 1.0f ) }, |
| { XMFLOAT3( | 0.0f, | 0.0f, 1.0f ) }, |

In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 2.0f, which means that the path segment is a line path segment. X0, Y0, X1, Y1 are the coordinates for the endpoints of the line path segment where (X0, Y0) represents a first endpoint and (X1, Y1) represents a second endpoint.

The remaining vertices and attributes in this example may be unused and/or may be used to indicate other attributes for the path segment. Other attributes for the path segment may include, e.g., whether the path segment is the beginning or end of an open path, whether the path segment should be displayed for the path, whether an endcap should be placed on either end of the path segment, what type of endcap should be used if any, whether a join should be placed on either end of the path segment, and what type of join to use if any.

The input path data for a cubic Bézier path segment may take the following form or a similar form:

| { XMFLOAT3( | X0, | Y0, 3.0f ) }, |
| { XMFLOAT3( | X1, | Y1, 1.0f ) }, |
| { XMFLOAT3( | X2, | Y2, 1.0f ) }, |
| { XMFLOAT3( | X3, | Y3, 1.0f ) }, |

In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 3.0f, which means that the path segment is a cubic Bézier path segment. X0-X3 and Y0-Y3 are the coordinates of the control points for the cubic Bézier path segment where (X0, Y0) represents a first control point, (X1, Y1) represents a second control point, etc. The remaining vertices and attributes in this example may be unused and/or may be used to indicate other attributes for the path segment. The other attributes for the path segment may include, in some examples, attributes similar to those described above with respect to the line path segment.

Similar input may be used for a quadratic Bézier path segment except that three control points may be provided instead of four control points, and the path segment type indicator may be different to distinguish the primitive from a cubic Bézier path segment. For example, the input path data for a quadratic Bézier path segment may take the following form or a similar form:

| { XMFLOAT3( | X0, | Y0, 1.0f ) }, |
| { XMFLOAT3( | X1, | Y1, 1.0f ) }, |
| { XMFLOAT3( | X2, | Y2, 1.0f ) }, |
| { XMFLOAT3( | 0.0f, | 0.0f, 1.0f ) }, |

In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 1.0f, which means that the path segment is a quadratic Bézier path segment. X0-X2 and Y0-Y2 are the coordinates of the control points for the quadratic Bézier path segment where (X0, Y0) represents a first control point, (X1, Y1) represents a second control point, etc. The remaining vertices and attributes in this example may be unused and/or may be used to indicate other attributes for the path segment. The other attributes for the path segment may include, in some examples, attributes similar to those described above with respect to the line path segment.

In some examples, the input path data for an elliptic arc path segment may include data indicative of a center parameterization of the elliptic arc path segment. For example, the input path data for an elliptic arc path segment may take the following form or a similar form:

| { XMFLOAT3( | X0, | Y0, 4.0f ) }, |
| { XMFLOAT3( | X1, | Y1, 1.0f ) }, |
| { XMFLOAT3( | c.x, | c.y, 1.0f ) }, |
| { XMFLOAT3( | theta0, | theta1, angle ) }, |

In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). The path segment type indicator, in this example may be any of 4.0, 4.1, 4.2 or 4.3 corresponding, respectively, to a large clockwise (LCW) elliptic arc, a large counter-clockwise (LCCW) elliptic arc, a small clockwise (SCW) elliptic arc, and a small counter-clockwise (SCCW) elliptic arc. X0, X1 and Y0, Y1 are endpoint coordinates of the elliptic arc path segment where (X0, Y0) represents an initial endpoint of the arc and (X1, Y1) represents a final endpoint of the arc. In addition, rH and rV represent horizontal and vertical radii, respectively, c.x and c.y are coordinates (c.x, c.y) that represent the center point of the ellipse of which the elliptic arc path segment is a part, angle represents the counter-clockwise rotation angle of the ellipse relative to the x axis measured prior to scaling by (rh, rv), theta0 represents the angle of the initial point of the elliptic arc (as measured on an unscaled circle), and theta1 represents the angle of the final point of the elliptic arc (as measured on an unscaled circle). Notably, even though the example input data form specified above is a center parameterization, the input data form may still include coordinates for the initial and final endpoints of the arc (i.e., (X0, Y0), (X1, Y1)). Such coordinates may be used, in some examples, to ensure water-tightness of the resulting geometry.

In further examples, the input path data for an elliptic arc path segment may include data indicative of an endpoint parameterization of the elliptic arc path segment. For example, the input path data for an elliptic arc path segment may take the following form or a similar form:

| { XMFLOAT3( | X0, | Y0, 4.0f ) }, |
| { XMFLOAT3( | X1, | Y1, 1.0f ) }, |
| { XMFLOAT3( | rH, | rV, 1.0f ) }, |
| { XMFLOAT3( | angle, | 0.0f, 1.0f ) }, |

In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). The path segment type indicator, in this example may be any of 4.0, 4.1, 4.2 or 4.3 corresponding, respectively, to a large clockwise (LCW) elliptic arc, a large counter-clockwise (LCCW) elliptic arc, a small clockwise (SCW) elliptic arc, and a small counter-clockwise (SCCW) elliptic arc. X0, X1 and Y0, Y1 are endpoint coordinates of the elliptic arc path segment where (X0, Y0) represents an initial endpoint of the arc and (X1, Y1) represents a final endpoint of the arc. In addition, rH and rV represent horizontal and vertical radii, respectively, and angle represents the counter-clockwise rotation angle of the ellipse relative to the x axis measured prior to scaling by (rh, rv).

In examples where the input path data includes an elliptic arc represented in an endpoint parametric form, CPU 6 may, in some examples, convert the representation of the elliptic arc from an endpoint parametric form into a center parametric form prior to sending data indicative of the elliptic arc to GPU 12 for rendering. For example, CPU 6 may generate a center parameterization of an elliptic arc based on an endpoint parameterization of the elliptic arc, and send the center parameterization of the elliptic arc to GPU 12. The center parameterization for the elliptic arc may conform to the example input data form specified above. The center parameterization may be used by CPU 6 to find the endpoint tangents and/or normals for the elliptic arc, which may in turn be used by CPU 6 to generate join primitives for rendering by GPU 12.

In some examples, stroking operations may use three additional fields of the vertex path data input to handle endcaps, joins and open paths. For example, certain vertex coordinates may store data indicative of whether the path segment is the beginning of an open path, the end of an open path, and whether the path segment may be dropped (e.g., the path segment is the closing path segment of an open path). The following is an example template that includes the above-described vertex attributes:

| { XMFLOAT3( | X0, | Y0, 2.0f ) }, |
| { XMFLOAT3( | X1, | Y1, 2.0f ) }, |
| { XMFLOAT3( | 0.0f, | 0.0f, 2.0f ) }, |
| { XMFLOAT3( | 0.0f, | 0.0f, 2.0f ) }, |

In this template, a 2.0f on the z coordinate (i.e. third coordinate or attribute) of the second vertex indicates that the path segment is the beginning of an open path and may signal to GPU 12 to put an endcap (i.e., a startcap) at the beginning of the path segment. A 2.0f on the z coordinate of the third vertex indicates that the path segment is the ending of an open path and may signal to GPU 12 to put an endcap at the end of the path segment. A 2.0f on the z coordinate of the last vertex indicates that the current primitive is to be dropped (e.g., it is the closing line or path segment of an open path).

To perform a path filling operation, input assembler 44 obtains path data 36 from memory 10, and passes the path data onto one or more subsequent stages of graphics pipeline 40 to render the path segments (e.g., path primitives) specified by path data 36. For example, input assembler 44 may obtain a plurality of vertices from a vertex buffer stored in memory 10 and cause vertex shader 46 to process the vertices. In some examples, input assembler 44 may pass the vertices to be processed directly to vertex shader 46. In additional examples, input assembler 44 may direct vertex shader 46 to retrieve particular vertices for processing from a vertex buffer in resources block 42.

Vertex shader 46 is configured to process vertices received from input assembler 44 and/or resources block 42 and to generate an output vertex for each input vertex processed by vertex shader 46. For example, for each input vertex, vertex shader 46 may execute an instance of a vertex shader program on a shader unit of GPU 12. In some examples, vertex shader 46 may execute a "pass-through" vertex shader program for each input vertex. The "pass-through" vertex shader program may cause vertex shader 46 to, for each input vertex, output a vertex that corresponds to the input vertex. In this case, an output vertex may correspond to an input vertex if the output vertex has the same attributes as the input vertex. To implement the "pass-through" vertex shader program, in some examples, vertex shader 46 may apply an identity transformation to each input vertex to generate an output vertex with the same attributes. The input vertices received by vertex shader 46 and the output vertices generated by vertex shader 46 may be alternatively referred to as input control points and output control points, respectively.

In further examples, vertex shader 46 may generate one or more output attributes for an output vertex that are not identical to the input attributes of a corresponding input vertex. For example, vertex shader 46 may perform substantive processing on one or more of the attributes of the input vertices to generate one or more attributes for the output vertices. As one example, vertex shader 46 may perform one or more of a world transformation, a view transformation, a projection transformation, or any combination thereof on the positional attributes of the input vertices to generate one or more attributes for the output vertices. As another example, vertex shader 46 may add and/or delete attributes from the set of input attributes to generate a set of output attributes for an output vertex.

Tessellation stages 62 (i.e., hull shader 48, tessellator 50, and domain shader 52) may tessellate a path segment defined by the input path data into a plurality of line segments. The plurality of line segments may approximate the curvature of the path segment to be rendered. In general, hull shader 48 may pass the control points received from vertex shader 46 to domain shader 52 for further processing, and provide configuration data to tessellator 50. Tessellator 50 may determine values at which one or more parametric equations that represent a particular type of path segment should be evaluated. Domain shader 52 may evaluate the parametric equations at the values determined by tessellator 50, and output a vertex for each evaluation. In some examples, each of the vertices output by domain shader 52 may include one or more attributes that are indicative of the position of the vertex. In additional examples, each of the vertices output by domain shader 52 may include one or more attributes that are indicative of the type of path rendering primitive associated with the vertex.

In some examples, hull shader 48 may process the control points received from vertex shader 46 and/or resources block 42 and may generate an output control point for each instance of the hull shader program executed by hull shader 48. For example, for each output control point to be generated by hull shader 48, hull shader 48 may execute an instance of a hull shader program on a shader unit of GPU 12. In some examples, hull shader 48 may execute a "pass-through" hull shader program for each output control point. The "pass-through" hull shader program may cause hull shader 48 to, for each output control point, output a control point that corresponds to a respective one of the input control points. In this case, an output control point may correspond to an input control point if the output control point has the same attributes as the input control point.

In further examples, hull shader 48 may generate one or more output attributes for an output control point that are not identical to the input attributes of a respective one of the input control points. For example, hull shader 48 may perform substantive processing on one or more of the attributes of the input control points to generate one or more attributes for the output control points. As another example, hull shader 48 may add and/or delete attributes from a set of input attributes to generate the set of output attributes for an output control point. In some examples, if GPU 12 receives path data for an elliptical arc that is in the form of an endpoint parameterization, hull shader 48 may convert the endpoint parameterization of the elliptical arc into a center parameterization for the elliptical arc as described in further detail below.

In additional examples, hull shader 48 may drop primitives that are not to be rendered for a particular rendering operation. Dropping a primitive may refer to the process of causing data corresponding to the primitive to not be passed on to further stages of graphics pipeline 40, thereby effectively causing such a primitive to not be rendered by the remainder of the pipeline. For example, when graphics pipeline 40 is performing a filling operation, hull shader 48 may drop join primitives and cap primitives. As another example, when graphics pipeline 40 is performing a stroking operation, hull shader 48 may drop close-path primitives for open paths. A close-path primitive may refer to a primitive that represents a line path segment that closes a loop. A close-path primitive is typically used for paths that are closed paths rather than open paths. In some examples, a close-path primitive may be identified by a different primitive type identifier than the primitive type identifier used for identifying other line path segments in a path. For example, a close path primitive may be identified by a primitive type identifier of 2.1f instead of 2.0f.

Hull shader 48 may also execute an instance of a patch constant function for each path segment. The patch constant function may determine and provide configuration parameters to tessellator 50 to be used by tessellator 50 when generating output values. For example, the patch constant function may cause hull shader 48 to provide tessellation factors to tessellator 50. The tessellation factors may specify a degree of tessellation that tessellator 50 is to apply to a particular tessellation domain (e.g., how finely the domain should be subdivided and/or the number of smaller objects into which the domain should be subdivided). In some examples, hull shader 48 may cause tessellator 50 to perform 4× tessellation for cubic Bézier curves, 4× tessellation for round joins and caps, and 1× tessellation for line segments.

As another example, the patch constant function may cause hull shader 48 to provide a type of tessellation domain to be used during tessellation to tessellator 50. A tessellation domain may refer to an object that is used by tessellator 50 to generate a plurality of coordinates for use by domain shader 52. Conceptually, the tessellation domain may correspond to an object that is subdivided by tessellator 50 into a plurality of smaller objects. The positional coordinates of the vertices of the smaller objects are then sent to domain shader 52 for further processing. In some examples, the type of tessellation domain may be selected to be one of a quad, a tri, and an isoline. The smaller objects into which the domain is subdivided, in some examples, may correspond to triangles, line segments, or points. In some examples, hull shader 48 may specify an isoline tessellation domain type and specify that tessellator 50 should subdivide the isoline domain into line segments.

Tessellator 50 may generate a plurality of output values for each path segment processed by tessellation stages 62. The output values may determine the values at which one or more parametric equations that represent a particular type of path segment should be evaluated by domain shader 52. In some examples, tessellator 50 may generate the plurality of output values based on one or more tessellation factors and/or a tessellation domain type provided to tessellator 50 by hull shader 48. For example, tessellator 50 may subdivide an isoline into a plurality of line segments, and generate an output value for each endpoint of the plurality of line segments in a normalized coordinate system.

Domain shader 52 may receive output values from tessellator 50 and control points for a path segment from hull shader 48, and generate output vertices that correspond to a plurality of tessellated line segments that approximate the curvature and/or shape of a path segment. For example, for each of the output values received from tessellator 50, domain shader 52 may execute an instance of a domain shader program on a shader unit of GPU 12. The domain shader program may cause domain shader 52 to, for each of the output values received from tessellator 50, evaluate one or more parametric equations at a particular value that is determined based on the respective output value to generate positional coordinates for an output vertex that corresponds to the respective output value. One or more of the coefficients of the parametric equations used to generate the output vertex coordinates may be defined based on one or more of the control points received from hull shader 48. Each output vertex may correspond to an endpoint of one of the plurality of tessellated line segments. Two consecutive output vertices may correspond to the endpoints of a single tessellated line segment.

In additional examples, the domain shader program may cause domain shader 52 to generate normal coordinates for output vertices that correspond to each of the output values received from tessellator 50. For example, the domain shader program may cause domain shader 52 to, for each of the output values received from tessellator 50, evaluate one or more additional parametric equations at a particular value that is determined based on the respective output value in order to generate tangent coordinates for an output vertex that corresponds to the respective output value. The tangent coordinates for an output vertex may be indicative of a direction of a tangent line of the path segment that intersects the path segment at the output vertex. Domain shader 52 may generate normal coordinates for each of the output vertices based on the tangent coordinates that correspond to the respective output vertex. The normal coordinates generated for a particular output vertex may be indicative of a normal vector that indicates a direction which is perpendicular to a tangent of the path segment that intersects the path segment at the output vertex.

In some examples, when graphics pipeline 40 is performing a filling operation, domain shader 52 may generate vertices corresponding to the locations of the endpoints of the tessellated line segments without generating any normals for such locations. In such examples, when graphics pipeline 40 is performing a stroking operation, domain shader 52 may, in some examples, generate vertices corresponding to the locations of the endpoints of the tessellated line segments and generate normals corresponding to such locations.

Domain shader 52 may output the vertices in an ordered sequence where each set of adjacent vertices represents a tessellated line segment. The line segments may collectively approximate the path segment that was defined in the vertex buffer. For example, domain shader 52 may output the following set of vertices {0, 1, 2, 3, 4, 5} that define the following line segments: {0, 1}, {1, 2}, {2, 3}, {3, 4}, {4, 5}. In additional examples, domain shader 52 may output the following set of vertices {0, 1, 1, 2, 2, 3, 3, 4, 4, 5} that may define the same line segments as listed in the previous example.

In some examples, tessellator 50 and domain shader 52 may be configured to uniformly tessellate a path segment into a plurality of line segments according to the following technique. Specifically, tessellator 50 may output coordinates for parametric evaluation (e.g., t=0/T, 1/T, 2/T . . . T/T, where T is the tessellation factor). Depending on the type of primitive, domain shader 52 may evaluate one or more parametric equations at the values that are output by tessellator 50.

For a line, T may, in some examples, be always equal to 1. In such examples, domain shader 52 may not necessarily need to perform any evaluation to generate vertices that correspond to the line path segment.

For a cubic Bézier curve, domain shader 52 may evaluate the curve and generate output vertices according to the following parametric equation:

$$V(t)=C0*(1-t)^3+C1*3*(1-t)^2*t+C2*3(1-t)*t^2+C3*t^3 \quad (1)$$

where t corresponds to an output value provided by tessellator 50, V(t) corresponds to an output vertex that is generated for a particular output value (i.e., t), and C0, C1, C2, C3 correspond to the control points for the cubic Bézier curve.

Alternatively, for the cubic Bézier curve, domain shader 52 may evaluate the curve and generate output vertices according to the following parametric equations:

$$x(t)=X0*(1-t)^3+X1*3*(1-t)^2*t+X2*3*(1-t)*t^2+X3*t^3 \quad (2)$$

$$y(t)=Y0*(1-t)^3+Y1*3*(1-t)^2*t+Y2*3*(1-t)*t^2+Y3*t^3 \quad (3)$$

where t corresponds to an output value provided by tessellator 50, x(t) corresponds to the x-coordinate of an output vertex that is generated for a particular output value (i.e., t), y(t) corresponds to the y-coordinate of the output vertex that is generated for the particular output value (i.e., t), and (X0, Y0), (X1, Y1), (X2, Y2), (X3, Y3) correspond to the control points for the cubic Bézier curve.

For a quadratic Bézier curve, domain shader 52 may evaluate the curve and generate output vertices according to the following parametric equation:

$$V(t)=C0*(1-t)^2+C1*2*(1-t)*t+C2*t^2 \quad (4)$$

where t corresponds to an output value provided by tessellator 50, V(t) corresponds to an output vertex that is generated for a particular output value (i.e., t), and C0, C1, C2 correspond to the control points for the quadratic Bézier curve.

Alternatively, for the quadratic Bézier curve, domain shader 52 may evaluate the curve and generate output vertices according to the following parametric equations:

$$x(t)=X0*(1-t)^2+X1*(1-t)*t+X2*t^2 \quad (5)$$

$$y(t)=Y0*(1-t)^2+Y1*(1-t)*t+Y2*t^2 \quad (6)$$

where t corresponds to an output value provided by tessellator 50, x(t) corresponds to the x-coordinate of an output vertex that is generated for a particular output value (i.e., t), y(t) corresponds to the y-coordinate of the output vertex that is generated for the particular output value (i.e., t), and (X0, Y0), (X1, Y1), (X2, Y2) correspond to control points for the quadratic Bézier curve.

For an elliptic arc path segment, domain shader 52 may evaluate the curve and generate output vertices according to the following parametric equations:

$$x=Center_x+rh \, Cos*\cos(angle_t)-rv \, Sin*\sin(angle_t) \quad (7)$$

$$y=Center_y+rh \, Sin*\cos(angle_t)+rv \, Cos*\sin(angle_t) \quad (8)$$

where the parameterization angle $angle_t$ is determined from tessellator output t, x corresponds to the x-coordinate of an output vertex that is generated for a particular parameterization angle (i.e., $angle_t$), y corresponds to the y-coordinate of the output vertex that is generated for the parameterization angle (i.e., $angle_t$), rh represents the horizontal radius of the unrotated ellipse, ry represents the vertical radius of the unrotated ellipse, rvCos, rvSin, rhCos and rhSin represent rv*Cos(angle), rv*Sin(angle), rh*Cos(angle) and rh*Sin(angle), respectively, and angle represents the counter-clockwise angle of the ellipse relative to the x axis measured prior to scaling by (rh, rv). In some examples, hull shader 48 may be configured to determine (e.g., precompute) cos(angle) and sin(angle) and/or to determine (e.g., precompute) the rvCos, rvSin, rhCos and rhSin values, and to provide these values to domain shader 52 for use in evaluating the above-recited parametric equations for elliptic arcs.

As discussed above with respect to elliptic arcs, the vertices in the patch control list, in some examples, may include data indicative of an endpoint parameterization for the elliptic arc. In such examples, hull shader 48 (e.g., a hull shader program executing on a shader unit of GPU 12) may be used to convert the data indicative of an endpoint parameterization of the elliptic arc to data indicative of a center parameterization of the elliptic arc.

An example technique for finding the correct center of an ellipse when converting an endpoint parameterization of an elliptic arc to a center parameterization of the elliptic arc is now described. The example technique may determine a center point (cx, cy) and the initial and final angles θ1 and θ2 of an ellipse and/or elliptic arc based on an endpoint representation of an ellipse defined by the set of parameters (x0, y0), (x1, y1), rh, rv, $f_S$, and $f_A$. An ellipse with center point (cx, cy), radii rh and rv, and rotation angle rot may satisfy the implicit equation $(x')^2 + (y')^2 = 1$, where $x' = ((x-cx)*\cos(rot) + (y-cy)*\sin(rot))/rh$ and $y' = (-(x-cx)*\sin(rot) + (y-cy)*\cos(rot))/rv$. The transformation from (x, y) to (x', y') maps the desired ellipse into a unit circle centered at the origin.

To determine the center points of the pair of ellipses with common radii and rotation angle that pass through the two given points $(x_0, y_0)$ and $(x_1, y_1)$, a plane is first transformed into a suitably scaled and rotated coordinate system such that the equation of each ellipse becomes $(x'-cx')^2 + (y'-cy')^2 = 1$. Then the centers (i.e., $(cx_0', cy_0')$ and $(cx_1', cy_1')$) of the two unit circles whose circumferences pass through two given points may be found. Finally, the center points are placed through an inverse transformation to obtain solutions in the original coordinate system.

The center points of the two unit circles that pass through points $(x_0, y_0)$ and $(x_1, y_1)$ are given by $(x_m \pm \Delta y * d, y_m \mp \Delta x * d)$, where $x_m = (x_0 + x_1)/2$, $y_m = (y_0 + y_1)/2$, $\Delta x = (x_0 - x_1)$, $\Delta y = (y_0 - y_1)$, and $d = \sqrt{1/(\Delta x^2 + \Delta y^2) - 1/4}$. If d is infinite or imaginary, no solution exists due to the input points being coincident or too far apart, respectively. The angles θ1 and θ2 may be found by finding the slope of the endpoints on the circle and computing arctangents.

The following pseudo-code illustrates the process of computing ellipse centers according to the above-described technique. The findUnitCircles function is called by findEllipses following inverse transformation of the original ellipse parameters.

```
/* Given: Points (x0, y0) and (x1, y1)
* Return: TRUE if a solution exists, FALSE otherwise
* Circle centers are written to (cx0, cy0) and (cx1, cy1)
*/
static VGboolean findUnitCircles(double x0, double y0,
                double x1, double y1,
                double *cx0, double *cy0,
                double *cx1, double *cy1)
{
    /* Compute differences and averages */
    double dx = x0 - x1;
    double dy = y0 - y1;
    double xm = (x0 + x1)/2;
    double ym = (y0 + y1)/2;
    double dsq, disc, s, sdx, sdy;
    /* Solve for intersecting unit circles */
    dsq = dx*dx + dy*dy;
    if (dsq == 0.0) return VG_FALSE; /* Points are coincident */
    disc = 1.0/dsq - 1.0/4.0;
    if (disc < 0.0) return VG_FALSE; /* Points are too far apart */
    s = sqrt(disc);
    sdx = s*dx;
    sdy = s*dy;
    *cx0 = xm + sdy;
    *cy0 = ym - sdx;
    *cx1 = xm - sdy;
    *cy1 = ym + sdx;
    return VG_TRUE;
}
/* Given: Ellipse parameters rh, rv, rot (in degrees),
* endpoints (x0, y0) and (x1, y1)
* Return: TRUE if a solution exists, FALSE otherwise
* Ellipse centers are written to (cx0, cy0) and (cx1, cy1)
*/
VGboolean findEllipses(double rh, double rv, double rot,
                double x0, double y0, double x1, double y1,
                double *cx0, double *cy0, double *cx1, double *cy1)
{
    double COS, SIN, x0p, y0p, x1p, y1p, pcx0, pcy0, pcx1, pcy1;
    /* Convert rotation angle from degrees to radians */
    rot *= M_PI/180.0;
    /* Pre-compute rotation matrix entries */
    COS = cos(rot); SIN = sin(rot);
    /* Transform (x0, y0) and (x1, y1) into unit space */
    /* using (inverse) rotate, followed by (inverse) scale */
    x0p = (x0*COS + y0*SIN)/rh;
    y0p = (-x0*SIN + y0*COS)/rv;
    x1p = (x1*COS + y1*SIN)/rh;
    y1p = (-x1*SIN + y1*COS)/rv;
    if (!findUnitCircles(x0p, y0p, x1p, y1p,
        &pcx0, &pcy0, &pcx1, &pcy1)) {
        return VG_FALSE;
    }
    /* Transform back to original coordinate space */
    /* using (forward) scale followed by (forward) rotate */
    pcx0 *= rh; pcy0 *= rv;
    pcx1 *= rh; pcy1 *= rv;
    *cx0 = pcx0*COS - pcy0*SIN;
    *cy0 = pcx0*SIN + pcy0*COS;
    *cx1 = pcx1*COS - pcy1*SIN;
    *cy1 = pcx1*SIN + pcy1*COS;
    return VG_TRUE;
}
```

Further details regarding converting an endpoint parameterization of an elliptic arc to a center parameterization of the elliptic arc may be found in the "OpenVG Specification, Version 1.1," Section 18.4, Dec. 3, 2008, available at: http://www.khronos.org/registry/vg/specs/openvg-1.1.pdf, the entire content of which is incorporated herein by reference.

Geometry shader 54 may receive tessellated line segments from domain shader 52 and generate a plurality of triangle primitives based on the tessellated line segments. For example, for each of the tessellated line segments, geometry shader 54 may execute an instance of a geometry shader program on a shader unit of GPU 12, and generate a triangle primitive for the tessellated line segment based on the respective tessellated line segment. In some examples, for each of the tessellated line segments, geometry shader 54 may receive two vertices from domain shader 52 that correspond to the respective tessellated line segment, and generate a set of three vertices that correspond to a triangle primitive. In some examples, two of the vertices of the triangle primitive may be the same vertices (e.g., have the same positional coordinates) as the two received vertices. In such examples, geometry shader 54 may generate the third vertex based on a common vertex that is common for all tessellated line segments associated with a path segment to be rendered. The common vertex may or may not correspond to one of the endpoints of the tessellated line segments. In some examples, the common vertex may correspond to the first vertex in a set of vertices that correspond to the tessellated line segments for a path segment to be rendered.

Geometry shader 54 may be invoked once for each of the tessellated line segments produced by domain shader 52. For each of the tessellated line segments, geometry shader 54 may generate a triangle primitive using a common control point as a first vertex of the triangle and using the two endpoints of the respective tessellated line segment as the second and third vertices of the triangle. For example, an example was provided above where domain shader 52 generated the following set of vertices {0, 1, 2, 3, 4, 5} that define the following line segments: {0, 1}, {1, 2}, {2, 3}, {3, 4}, {4, 5}. For the above-listed sequence of line segments, geometry shader 54 may generate the following triangles: {C, 0, 1}, {C, 1, 2}, {C, 2, 3}, {C, 3, 4}, {C, 4, 5}, {C, 4, 5} where is any single vertex that is common to all of the triangles.

Rasterizer 56 may be configured to convert a plurality of 3D graphics primitives (e.g., points, lines, and triangles) into a plurality of pixels that correspond to the 3D graphics primitives. For example, rasterizer 56 may receive three vertices that correspond to a triangle primitive, and convert the three vertices into a plurality of pixels that correspond to the screen pixel locations that are covered by the triangle primitive. Screen pixel locations that are covered by the triangle primitive may include screen pixel locations that correspond to the vertices of the triangle, the edges of the triangle, and the interior of the triangle.

Pixel shader 58 may receive pixels from rasterizer 56, and generate shaded pixels based on the received pixels according to a pixel shader program. For example, for each pixel received from rasterizer 56, pixel shader 58 may execute an instance of a pixel shader program on a shader unit of GPU 12. In some examples, pixel shader 58 may execute a "pass-through" pixel shader program for each pixel. The "pass-through" pixel shader program may cause pixel shader 58 to, for each pixel, output a pixel that corresponds to a respective one of the input pixel. In this case, an output pixel may correspond to an input pixel if the output pixel has the same attributes as the input pixel.

In further examples, pixel shader 58 may generate one or more output attributes for an output pixel that are not identical to the input attributes of a respective one of the input pixels. For example, pixel shader 58 may perform substantive processing on one or more of the attributes of an input pixel to generate one or more attributes for an output pixel. As another example, pixel shader 58 may add and/or delete attributes from a set of input attributes to generate the set of output attributes for an output pixel.

Output merger 60 may place pixel data received from pixel shader 58 into a render target (e.g., a frame buffer or a stencil buffer). In some examples, output merger 60 may merge the pixel data received from pixel shader 58 with the pixel data already stored in a render target based on a raster operation.

To perform the path filling operation, rasterizer 56 may rasterize each of the triangles received by geometry shader 54 into a common stencil buffer (e.g., a buffer stored in resources block 42). During the first pass, pixel shader 58 may be disabled or set to a "pass-through" mode to pass input pixels directly to output merger 60. Output merger 60 may be configured to populate the stencil buffer such that the stencil buffer stores values which are indicative of a fill area for the path segment according to one or more stencil buffer filling techniques.

According to a first stencil buffer filling technique, for each of the rasterized primitives, output merger 60 may invert the values in the stencil buffer that correspond to pixels which are covered by the rasterized primitive. With this technique, after all of the primitives have been rasterized to the stencil buffer, any inverted values in the stencil buffer may represent a fill area for the path segment to be rendered.

According to a second stencil buffer filling technique, for each of the rasterized primitives, output merger 60 may increment values in the stencil buffer that correspond to pixels which are covered by the rasterized primitive if a vertex order for the rasterized primitive is oriented in a clockwise direction, and decrement values in the stencil buffer that correspond to pixels which are covered by the rasterized primitive if a vertex order for the rasterized primitive is oriented in a counter-clockwise direction. With this technique, after all of the primitives have been rasterized to the stencil buffer, any non-zero values in the stencil buffer may represent a fill area for the path segment to be rendered.

Figure 4:
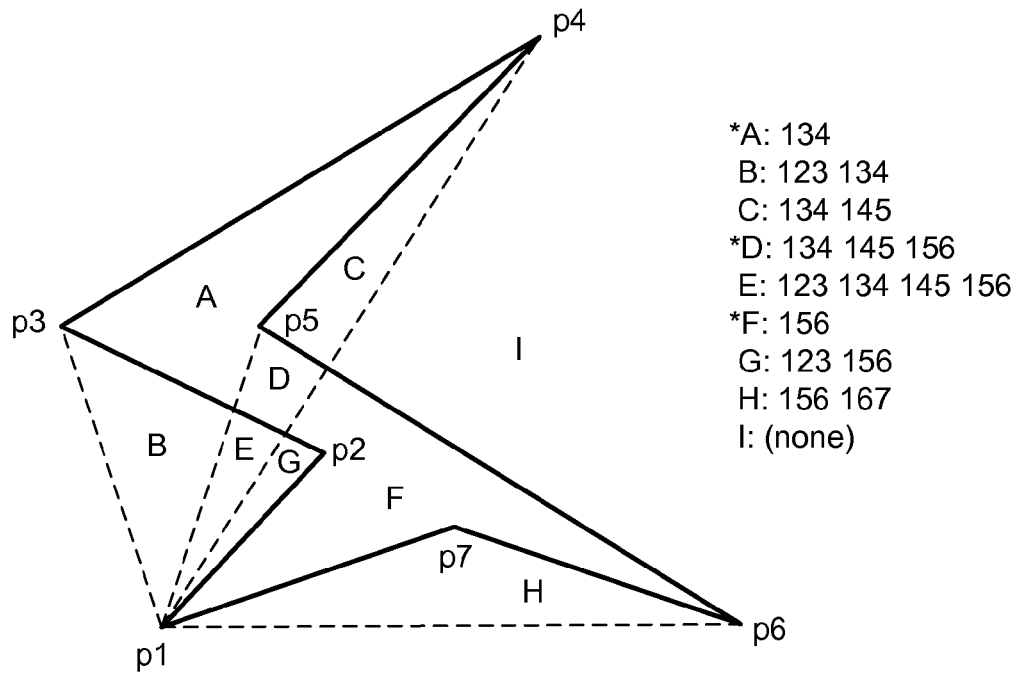
FIG. 4 is a conceptual diagram illustrating an example polygon to be filled using the path filling techniques of this disclosure.

FIG. 4 is a conceptual diagram illustrating an example polygon to be filled using the path filling techniques of this disclosure. The polygon may represent, in some examples, a path and/or a path segment to be filled. In some examples, a two-pass filling algorithm may be performed with respect to the plurality of connected line segments (p0p1, p1p2, p2,p3, etc.) shown in FIG. 4 as follows:

Pass 1
1. Clear the stencil buffer and disable writing into the color buffer. Pick an arbitrary point C.
2. Break the boundary of the Polygon into sequence of directed line segments p0p1,p1p2, . . . .
3. Construct a triangle fan center at C: Cp0p1, Cp1p2, Cp2p3 . . . .
4. Draw every triangle and set the stencil operation to be INVERT(EVEN/ODD) or INCR(NOZERO).

Pass 2
1. Draw a big quad/triangle covering the whole screen and draw to the pixels where stencil value is not zero.

In some examples, point p1 shown in FIG. 4 may be selected as the common point (C) for generating a triangle fan, and a triangle fan may be generated that includes the following triangles: {p1, p2, p3}, {p1, p3, p4}, {p1, p4, p5}, {p1, p5, p6}, {p1, p6, p7}. The target fill region for the path shown in FIG. 4 is the union of regions A, D and F.

As shown in FIG. 4, regions A, D and F are the only regions that are within an odd number of the triangles formed by the triangle fan. Thus, if these triangles are rendered according to the first stencil buffer filling technique where the values in the stencil buffer that correspond to pixels which are covered by the rasterized primitive are inverted, then after all of the primitives have been rasterized to the stencil buffer, any inverted values in the stencil buffer may correspond to the union of regions A, D and F (i.e., the fill area for the path segment to be rendered).

In addition, regions A, D and F are the only regions that are within an unbalanced number of clockwise and counter-clockwise triangles formed by the triangle fan. Regions that are within an unbalanced number of clockwise and counter-clockwise triangles may refer to regions where the total number of triangles of which the region is inside is not equal to the total number of triangles of which the region is outside. Thus, if these triangles are rendered according to the second stencil buffer filling technique where the values in the stencil buffer are either incremented or decremented depending on whether the triangle is oriented in a clockwise or counter-clockwise direction, then after all of the primitives have been rasterized to the stencil buffer, any non-zero values in the stencil buffer may correspond to the union of regions A, D and F (i.e., the fill area for the path segment to be rendered).

Further details regarding the use of a stencil buffer to fill a polygon may be found in the "OpenGL Programming Guide: The Official Guide to Learning OpenGL, Version 1.1," available at: http://www.glprogramming.com/red/chapter14.html#name13, the entire contents of which is incorporated herein by reference.

The first pass completes after all of the primitives generated by geometry shader 54 have been rendered into the stencil buffer. During the second pass, a bounding box (e.g., formed from two triangle primitives) that encompasses the fill area is rendered into a render target (e.g., the frame buffer) with the stencil test enabled. The data in the stencil buffer may cause pixels inside of the fill area to light up with a fill color (specified by CPU 6 prior to the second rendering pass), and cause pixels that are outside of the fill area to remain dark. During the second pass, tessellation stages 62 and geometry shader 54 may be disabled. Vertex shader 46 may be configured to perform standard vertex shader operations (e.g., transforms) for rendering 3D graphics primitives. Pixel shader 58 may be configured to perform standard operations and/or configured to operate in a "pass-through" mode. Once the second pass is complete, the render target (e.g., the frame buffer) may store a rasterized version of the fill area for the path segment.

The stroking operation may utilize a single-pass approach that may generally involve the following steps:
1. Tessellate a path segment into a plurality of line segments.
2. Calculate normals for the endpoints of the line segments.
3. Determine a stroke area by widening the line segments using the normals.
4. Generate primitives corresponding to the stroke area.
5. Render the primitives to a render target with depth test enabled.

The input processing and tessellation operations are substantially similar to the input processing and tessellation operations described with respect to the filling operation, and therefore will not be described in further detail.

In addition to domain shader 52 evaluating parametric equations to generate positional coordinates for vertices, as described above with respect the filling operation, domain shader 52 may also generate normal coordinates (e.g., normal vectors or normals) for the vertices during the stroking operation. The normal coordinates generated for a particular output vertex may be indicative of a normal vector that indicates a direction which is perpendicular to a tangent of the path segment that intersects the path segment at the output vertex.

To generate the normals, domain shader 52 may evaluate additional parametric equations for each of the values generated by tessellator 50, and may output one or more normals based on each evaluation. For example, for each of the output values received from tessellator 50, domain shader 52 may evaluate one or more parametric equations at a particular value that is determined based on the respective output value to generate one or more tangent coordinates for an output vertex that corresponds to the respective output value. The tangent coordinates for an output vertex may be indicative of a direction of a tangent line of the path segment that intersects the path segment at the output vertex. Domain shader 52 may generate normal coordinates for each of the output vertices based on the tangent coordinates that correspond to the respective output vertex. The normal coordinates generated for a particular output vertex may be indicative of a normal vector that indicates a direction which is perpendicular to a tangent of the path segment that intersects the path segment at the output vertex.

In some cases, the normal coordinates may be output as attributes of a vertex that is output by domain shader 52. For example, for the stroking operation, an output vertex produced by domain shader 52 may include one or more attributes that are indicative of the position of the vertex, one or more attributes that are indicative of a normal associated with the vertex, and one or more attributes that are indicative of the type of path rendering primitive (e.g., a type of path segment) associated with the vertex. The normal attributes may be indicative of a normal vector for a point on the path segment that corresponds to the parameter value generated by tessellator 50.

For line segments, the direction of the tangent for each of the endpoints of the line segment may correspond to the direction of the line segment itself. As such, the tangent coordinates may be obtained by taking the vector difference between the end point and the starting point of the line segment (e.g., (X1−X0, Y1−Y0)).

To generate the normals for curved path segments (e.g., Bézier curves and elliptic arcs), the tangent formulae for the curved path segments may be used. In general, the tangent formulae for curves and elliptic arcs (which may be used to determine the normals) are the derivatives of the parametric formulas described above with respect to generating the vertices for the curves and arcs.

For example, for a cubic Bézier curve, domain shader 52 may generate tangent coordinates for the output vertices of the curve based on the following parametric equation:

$$N(t)=C0*-3*(1-t)^2+C1*(-6*(1-t)*t+3*(1-t)^2)+C2* \\ (-3*t^2+6*(1-t)*t)+C3*3*t^2 \qquad (9)$$

where t corresponds to an output value provided by tessellator 50, N(t) corresponds to one or more tangent coordinates that are generated for a particular output value (i.e., t), and C0, C1, C2, C3 correspond to the control points for the cubic Bézier curve. A derivative of the parametric equation for the quadratic Bézier curve provided above may be used to generate tangent coordinates for a quadratic Bézier curve in a similar fashion.

Alternatively, for the cubic Bézier curve, domain shader 52 may generate tangent coordinates for the output vertices of the curve based on the following parametric equations:

$$x(t)=X0*-3*(1-t)^2+X1*(-6*(1-t)*t+3*(1-t)^2)+X2*(- \\ 3*t^2+6*(1-t)*t)+X3*3*t^2 \qquad (10)$$

$$y(t)=Y0*-3*(1-t)^2+Y1*(-6*(1-t)*t+3*(1-t)^2)+Y2*(- \\ 3*t^2+6*(1-t)*t)+Y3*3*t^2 \qquad (11)$$

where t corresponds to an output value provided by tessellator 50, x(t) corresponds to the x-coordinate of a tangent that corresponds to a particular output value (i.e., t), y(t) corresponds to the y-coordinate of the tangent that corresponds to the particular output value (i.e., t), and (X0, Y0), (X1, Y1), (X2, Y2), (X3, Y3) correspond to the control points for the cubic Bézier curve. A derivative of the parametric equations for the quadratic Bézier curve provided above may be used to generate tangent coordinates for a quadratic Bézier curve in a similar fashion.

For an elliptic arc path segment, domain shader 52 may generate tangent coordinates for the output vertices of the curve based on the following parametric equations:

$$\text{Tan}_x=-rh\ \text{Cos}*\sin(\text{angle}_t)-rv\ \text{Sin}*\cos(\text{angle}_t) \qquad (12)$$

$$\text{Tan}_y=-rh\ \text{Sin}*\sin(\text{angle}_t)+rv\ \text{Cos}*\cos(\text{angle}_t) \qquad (13)$$

where the parameterization angle, $angle_t$, is determined from tessellator output (i.e., t), $Tan_x$ is the x-coordinate of a tangent of the elliptic arc that corresponds to a particular parameterization angle (i.e., $angle_t$), $Tan_y$ is the y-coordinate of the tangent of the elliptic arc that corresponds to the particular parameterization angle (i.e., $angle_t$), rh represents the horizontal radius of the unrotated ellipse, ry represents the vertical radius of the unrotated ellipse, rvCos, rvSin, rhCos and rhSin represent rv*Cos(angle), rv*Sin(angle), rh*Cos(angle) and rh*Sin(angle), respectively, and angle represents the counter-clockwise angle of the ellipse relative to the x axis, measured prior to scaling by (rh, rv). In some examples, hull shader 48 may be configured to determine (e.g., precompute) cos(angle) and sin(angle) and/or to determine (e.g., precompute) the rvCos, rvSin, rhCos and rhSin values, and to provide these values to domain shader 52 for use in evaluating the above-recited parametric equations for ellipses.

Domain shader 52 may, in some examples, generate a normal vector (e.g., normal coordinates) for each of the output vertices based on the tangent coordinates for the respective output vertex according to the following equation:

$$\text{normal}=\text{normalize}(-Tan_x, Tan_y) \quad (14)$$

where normal corresponds to a normal vector for a particular vertex, $Tan_x$ corresponds to the x-coordinate of a tangent of a path segment that intersects the path segment at the particular vertex, $Tan_y$ corresponds to the y-coordinate of the tangent of the path segment that intersects the path segment at the particular vertex, and normalize(x,y) is a function that generates a normalized version of an input vector (x,y). A normalized version of the vector (x,y) may refer to a vector that has the same direction as vector (x,y) and a unit length (i.e., a length (e.g., norm) of one).

As discussed above with respect to elliptic arcs, the vertices in the patch control list may, in some examples, include data indicative of an endpoint parameterization. In such examples, hull shader 48 may convert the data indicative of an endpoint parameterization of the elliptic arc to data indicative of a center parameterization of the elliptic arc.

Geometry shader 54 may receive the line segments and the normals produced by domain shader 52, and generate primitives (e.g., triangles) that spatially correspond to the stroke area for each of the line segments. The stroke area for each of the line segments may collectively approximate the stroke area for the original path segment.

In general, each line segment may be defined by two consecutive points (p0, p1) on a path and the normals (n0, n1) at each of the points. To determine the stroke area for a line segment, geometry shader 54 may determine four corner points (u0, l0, u1, l1) of the stroke area for the line segment according to the following equations:

$$u0=p0+n0*\text{StrokeWidth} \quad (15)$$

$$l0=p0-n0*\text{StrokeWidth} \quad (16)$$

$$u1=p1+n1*\text{StrokeWidth} \quad (17)$$

$$l1=p1-n1*\text{StrokeWidth} \quad (18)$$

where p0 and p1 are endpoints of the line segment for which the stroke area is being determined, n0 is the normal vector corresponding to p0, n1 is the normal vector corresponding to p1, and StrokeWidth is the stroke width defined by the user application and passed to GPU 12 (e.g., via one or more vertex attributes and/or state commands).

Figure 5:
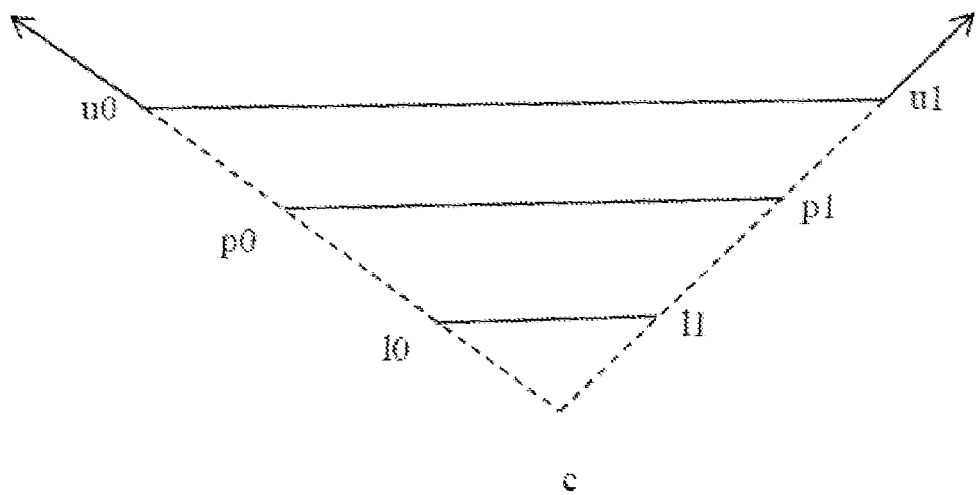
FIG. 5 is a conceptual diagram illustrating an example stroke area configuration where the intersection point of the normal vectors is outside of the stroke area.
Figure 6:
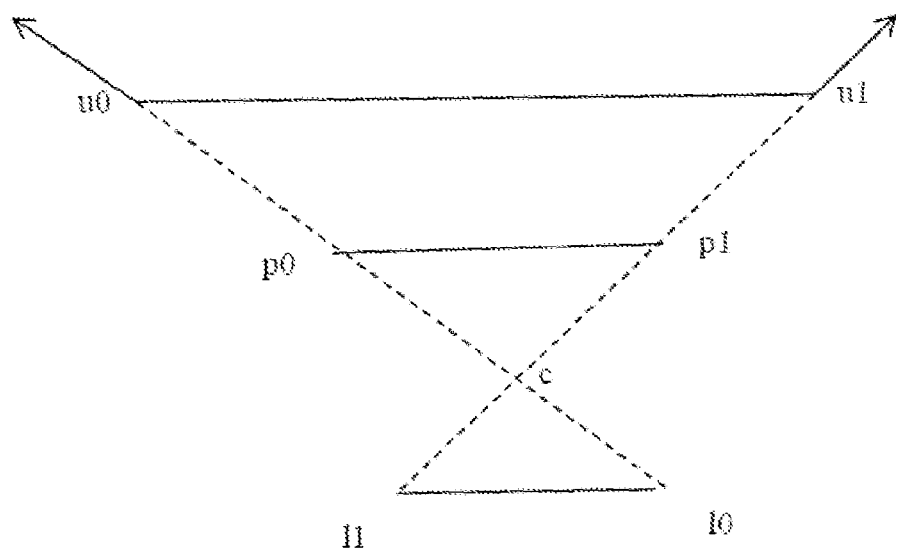
FIG. 6 is a conceptual diagram illustrating an example stroke area configuration where the intersection point of the normal vectors is inside of the stroke area.

FIGS. 5 and 6 illustrate two different stroke area configurations for a given line segment. Depending on the value of the stroke width, two different cases may be applicable to the shape of the stroke area as shown in FIGS. 5 and 6. The point c is defined as the point where the normal vectors intersect (i.e., the intersection of the line formed by u0 and l0 and the line formed by u1 and l1), and may be referred to as the intersection point.

Geometry shader 54 may determine whether the intersection point is outside of the stroke area (e.g., FIG. 5) or inside of the stroke area (e.g., FIG. 6), and generate one or more primitives that spatially correspond to the stroke area based on the determination. To determine whether the intersection point is outside of the stroke area, geometry shader 54 may determine whether strokewidth<min(u0c,u1c). If strokewidth<min(u0c,u1c), geometry shader 54 may determine that the intersection point is outside of the stroke area. Otherwise, geometry shader 54 may determine that the intersection point is inside of the stroke area.

If the stroke width is small enough (strokewidth<min(u0c, u1c)) so that the two line segment (u0,u1) and (l0,l1) have the same orientation, then the shape of stroke area for the line segment may be a quad (FIG. 5). Otherwise the shape of the stroke area for the line segment may be two head-to-head triangles (i.e., a butterfly) (FIG. 6).

If the intersection point is outside of the stroke area (e.g., FIG. 5), then geometry shader 54 may generate two triangles to form a quad that spatially corresponds to the stroke area. For example, geometry shader 54 may generate two triangles using the following combinations of vertices {u0, u1, l1} and {l1, l0, u0}.

If the intersection point is inside of the stroke area (e.g., FIG. 6), then geometry shader 54 may generate two triangles to form a butterfly that spatially corresponds to the stroke area. For example, geometry shader 54 may generate two triangles using the following combinations of vertices {u0, u1, c} and {c, l0, l1} if the {u0, u1, c} triangle is oriented in a clockwise direction, and generate two triangles using the following combinations of vertices {u0, u1, c} and {c, l1, l0} if the {u0, u1, c} triangle is oriented in a counter-clockwise direction.

To determine if the {u0, u1, c} triangle is oriented in a clockwise direction, geometry shader 54 may determine whether sin(a0+a1)>0 in the equations defined below. If sin(a0+a1)>0, then geometry shader 54 may determine that the {u0, u1, c} triangle is oriented in a clockwise direction. Otherwise, geometry shader 54 may determine that the {u0, u1, c} triangle is oriented in a counter-clockwise direction.

The distances u0c and u1c, which may be used to determine the shape of the stroke area and also determine the coordinates of the center point C, may be determined based on the following formulas:

$$v = \text{normalize}(n1 - n0) \quad (19)$$

$$\sin(a0) = n0 \times v, \cos(a0) = n0 \cdot v \quad (20)$$

$$\sin(a1) = v \times n1, \cos(a1) = v \cdot n1 \quad (21)$$

$$\sin(a0 + a1) = \sin(a0)\cos(a1) + \cos(a0)\sin(a1) \quad (22)$$

$$u0c = \sin(a1)\frac{|u1 - u0|}{\sin(a0 + a1)}, u1c = \sin(a0)\frac{|u1 - u0|}{\sin(a0 + a1)} \quad (23)$$

$$c = u0 - n0 \cdot u0c \quad (24)$$

where n0 is the normal for endpoint p0, and n1 is the normal for endpoint p1.

If strokewidth<min(u0c,u1c), then the stroke area for the line segment may be a simple quad. In such a case, GPU 12 may draw two (2) triangles (u0,u1,l1) and (l1,l0,u1). In some examples, regardless of the position of p0,p1,n0,n1, when strokewidth<min(u0c,u1c), the two triangles may always be clockwise.

If strokewidth>min(u0c,u1c), then there are 2 cases. If sin(a0+a1)>0, which means triangle (u0,u1,c) is clockwise, then the triangles drawn by GPU 12 are (u0,u1,c) and (c,l0,l1). If sin(a0+a1)<0, then the triangles drawn by GPU 12 are (u1,u0,c), (c,l1,l0).

In some cases, when primitives corresponding to the stroke areas of the line segments are generated (e.g., by geometry shader 54), the neighboring line segments may form a T junction if one or both of the stroke areas forms a butterfly shape (e.g. FIG. 6). This is because the center point C is not at the same position for the different line segments.

Figure 7:
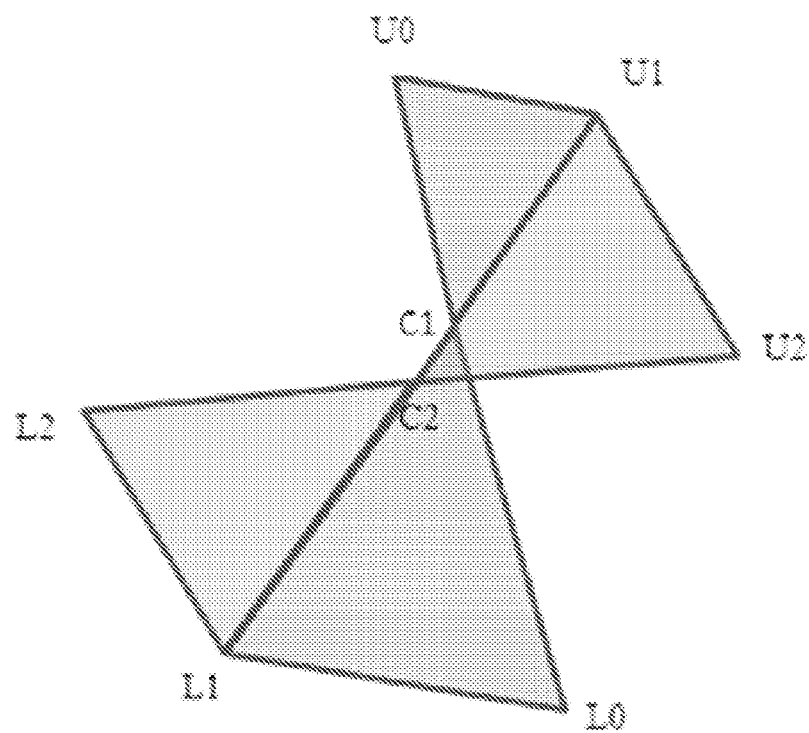
FIG. 7 is a conceptual diagram illustrating an example T-junction that may be formed between two triangles that form a stroke area.

FIG. 7 is a conceptual diagram illustrating an example T-junction that may be formed between triangles (U0,U1, C1) and (U1,U2,C2). The T-junction may cause one or more pixels to be missing (e.g., not properly rendered and/or occluded) in the final rendering result. In some examples, in order to address the above-mentioned issue, GPU 12 may draw two redounded triangles (C1,U0,L0), (C1,U1,L1). To make sure that the two triangles will not be culled because of back face culling, if GPU 12 includes a back face culling feature (e.g., as part of rasterizer 56) such a feature may, in some examples, be disabled or turned off.

Rasterizer 56 may rasterize each of the primitives generated by geometry shader 54 into a render target (e.g., the frame buffer). During the output merger stage, all pixels that are covered by the primitives generated by geometry shader 54 may be lit up with a stroke color (specified by the CPU prior to the rendering pass). Pixel shader 58 may be configured to perform standard operations and/or configured to operate in a "pass-through" mode during the rendering pass. The single rendering pass completes after rendering all of the primitives generated by geometry shader 54. Once the rendering pass is complete, the render target (e.g., the frame buffer) may store a rasterized version of the stroke area for the path segment.

As discussed above, in addition to rendering primitives that spatially correspond to the stroke area of the path segments to be rendered, the stroking operation may also involve applying various types of end caps to the ends of a path and/or applying various types of joins between the endpoints of interior path segments of a path. In some examples, these operations may be able to be implemented with a DX11 pipeline using one or more of the techniques described below.

Techniques are now described for rendering joins. Joins may be applied at locations where different path segments meet. In some examples, there may be three different types of joins: (1) bevel; (2) miter; and (3) round. In some examples, the type of join to be rendered may be stored in a buffer in GPU 12 (e.g., a patch constant buffer), and CPU 6 may indicate the type of join to use for rendering by placing a value indicative of the type of join into the buffer.

A join may be formed at a location or position where two path segments meet. To render a join, CPU 6 may place data indicative of the position where the two path segments meet and data indicative of the two tangents at that position (i.e., one tangent for each path segment) into a buffer (e.g., a vertex buffer in path data 36) for consumption by GPU 12.

In some examples, the input path data for a join may take the following form or a similar form:

| | | | |
|---|---|---|---|
| { XMFLOAT3( | pos.x, | pos.y, | 5.0f ) }, |
| { XMFLOAT3( | tan0.x, | tan0.y, | 1.0f ) }, |
| { XMFLOAT3( | tan1.x, | tan1.y, | 1.0f ) }, |
| { XMFLOAT3( | 0.0f, | 0.0f, | 1.0f ) }, |

In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 5.0f, which means that the path segment is a join path segment. The type of join path segment (e.g., bevel, miter, or round) may be indicated by a value stored in a buffer (e.g., a patch constant buffer) of GPU 12. In this example, pos.x and pos.y are the (x, y) coordinates that correspond to the position or location where the two path segments meet, tan 0.x and tan 0.y are the (x, y) coordinates that correspond to a tangent for a first one of the two path segments at the position or location where the two path segments meet, and tan 1.x and tan 1.y are the (x, y) coordinates that correspond to a tangent for a second one of the two path segments at the position or location where the two path segments meet. The tangent coordinates for each of the path segments may indicate a direction of a tangent of the respective path segment relative to the position or location where the two path segments meet. In some examples, CPU 6 may determine the coordinates for the tangents based on data indicative of one or both of the two path segments. The remaining vertices and attributes in this example may be unused and/or may be used to indicate other attributes for the join.

In some examples, to render a join, hull shader 48 may convert the tangent coordinates {(tan 0.x, tan 0.y) and (tan 1.x, tan 1.y)} that correspond to the join from Cartesian coordinates to angular coordinates. In further examples, hull shader 48 may normalize the tangents {(tan 0.x, tan 0.y) and (tan 1.x, tan 1.y)} that correspond to the join prior to converting the Cartesian coordinates to angular coordinates. In additional examples, hull shader 48 may place the angular coordinates for the tangents into one or more attributes of the patch control list received by hull shader 48 and pass the modified patch control list to domain shader 52 for further processing.

As one specific example, an input patch control list received by hull shader 48 for a join may be as follows:

| | | | |
|---|---|---|---|
| { XMFLOAT3( | 0.4f, | 0.8f, 5.0f ) } | // location |
| { XMFLOAT3( | 0.8f, | 0.0f, 1.0f ) } | // first tangent |
| { XMFLOAT3( | 0.2f, | −0.2f, 1.0f ) } | // second tangent |
| { XMFLOAT3( | 0.0f, | 0.0f, 1.0f ) } | |

In this example, hull shader 48 may generate an angular coordinate for each tangent and, for each tangent, place the angular coordinate into the third attribute of the control point that corresponds to the respective tangent. The resulting patch control list may, in some examples, take the following form:

```
{ XMFLOAT3(    0.4f,    0.8f, 5.0f ) } // location
{ XMFLOAT3(    0.8f,    0.0f, 0.0f ) } // first tangent
{ XMFLOAT3(    0.2f,   -0.2f, 5.5f ) } // second tangent
{ XMFLOAT3(    0.0f,    0.0f, 1.0f ) }
```

In some examples, hull shader 48 may implement the following pseudo-code and/or shader program code to normalize the tangents, and convert the Cartesian coordinates for the tangents into angular coordinates:

```
if ( (join AND (ControlPointId == 1 or 2) ) OR (cap AND
ControlPointId == 1) )
{
    // convert tangent to angle for faster lerping later
    normalizedTangent = normalize( inputPatch[ControlPointId] )
    angle = acos( normalizedTangent.x )
    if ( normalizedTangent.y < 0 )
    angle = 2.0f*PI – angle;
    // save the angle representation in the Z coordinate of the
control point vertex
    output.z = a0;
}
```

Figure 8:
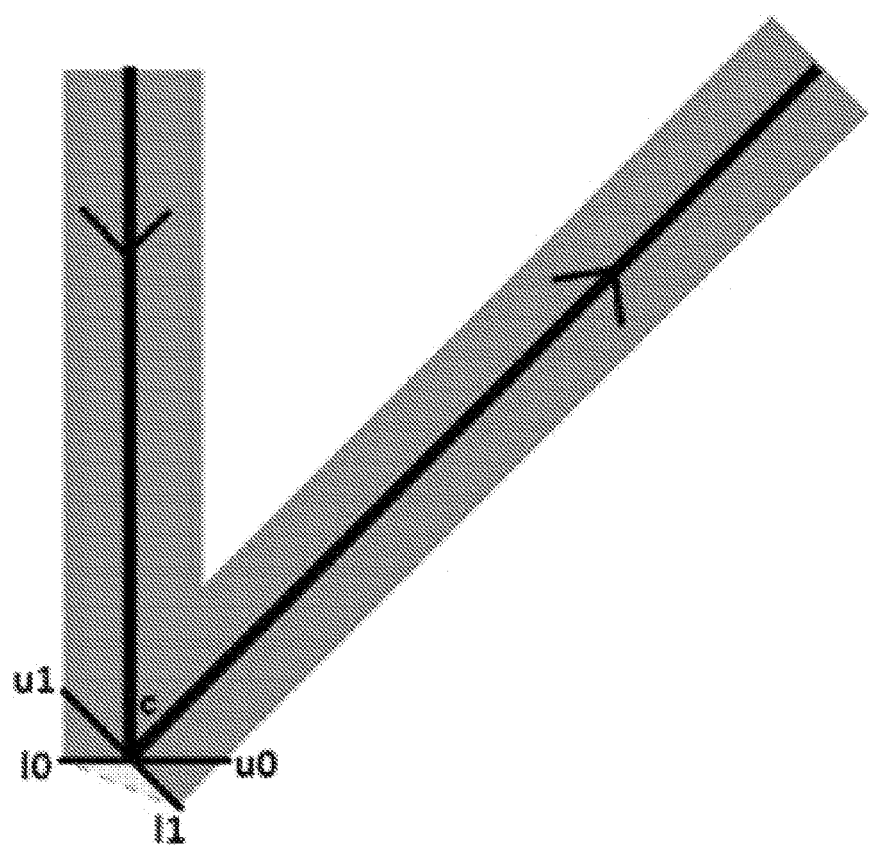
FIG. 8 is a conceptual diagram illustrating an example bevel join.

FIG. 8 is a conceptual diagram illustrating an example bevel join. For bevel joins, GPU 12 may render one or more triangles that spatially correspond to the bevel area (e.g., the light-shaded triangle shown in FIG. 8). As shown in FIG. 8, point c may correspond to an endpoint of a path segment where two path segments meet, u0 and l0 may correspond to corner points generated based on the first path segment for the endpoint (i.e., c), and u1 and l1 may correspond to corner points generated based on the second path segment for the endpoint (i.e., c).

In some examples, domain shader 52 may receive data indicative of a join to be rendered from hull shader 48, generate one or more vertices that correspond to the join to be rendered, and provide the vertices to geometry shader 54 for further processing. The data indicative of the join to be rendered may include data indicative of the position or location where the two path segments meet, data indicative of a tangent for a first one of the two path segments at the position or location where the two path segments meet, data indicative of a tangent for a second one of the two path segments at the position or location where the two path segments meet, and data indicative of the type of path rendering primitive (e.g., a join in this case). In some examples, the data indicative of the join to render may take the form of a patch control list (e.g., the patch control list specified above).

For each of the tangents associated with the bevel join, domain shader 52 may generate a normal that corresponds to the respective tangent based on the data indicative of the respective tangent received by domain shader 52. For example, domain shader 52 may generate a normal for each tangent based on equation (14). The one or more vertices produced by domain shader 52 may include one or more attributes indicative of the common endpoint where two path segments meet (i.e., point c), one or more attributes indicative of the normals for each of the path segments at the common endpoint, and one or more attributes indicative of the type of path rendering primitive (e.g., a join in this case).

Geometry shader 54 may, in some examples, receive the one or more vertices from domain shader 52, and determine the corner points (u0, u1, l0, l1) for the endpoints of the path segments where two path segments meet based on one or more of equations (15)-(18) as described in this disclosure.

In general, there are two possible triangles that may correspond to the bevel join area, (c, l1, l0) and (c, u0, u1). FIG. 8 illustrates an example where the (c, l1, l0) triangle corresponds to the bevel join area.

To avoid drawing an unnecessary triangle, geometry shader 54 may, in some examples, take the cross product of the difference vectors (u0–l0) and (u1–l1) and identify which triangle to draw based on the cross product of the difference vectors. In further examples, geometry shader 54 may take the cross product of the normals for each of the intersecting path segments at the endpoint where the two path segments meet (i.e., c), and identify which triangle to draw based on the cross product of the difference vectors. Geometry shader 54 may generate a triangle primitive for the identified triangle that corresponds to the bevel area and pass the triangle primitive on to one or more subsequent stages of graphics pipeline 40 (e.g., rasterizer 56) such that GPU 12 renders the identified triangle.

In either of the above-mentioned examples, geometry shader 54 may determine which triangles to draw or render for the bevel join based on the sign of the cross product. For example, if the sign of the cross product in either of the above examples is negative, then geometry shader 54 may determine to draw the (c, l1, l0) triangle for the bevel join and to not draw the (c, u0, u1) triangle for the bevel join. On the other hand, if the sign of the cross product in either of the above examples is positive, then geometry shader 54 may determine to draw the (c, u0, u1) triangle for the bevel join and to not draw the triangle (c, l1, l0). In some examples, determining to draw a particular triangle may correspond to geometry shader 54 generating and outputting the particular triangle and determining not to draw a particular triangle may correspond to geometry shader 54 not generating and/or not outputting the particular triangle.

Graphics pipeline 40 may render the one or more triangles generated by geometry shader 54 for the bevel join area. Once the one or more triangles have been rendered, the render target (e.g., the frame buffer) may store a rasterized version of the stroke area for a bevel join between the two path segments.

Figure 9:
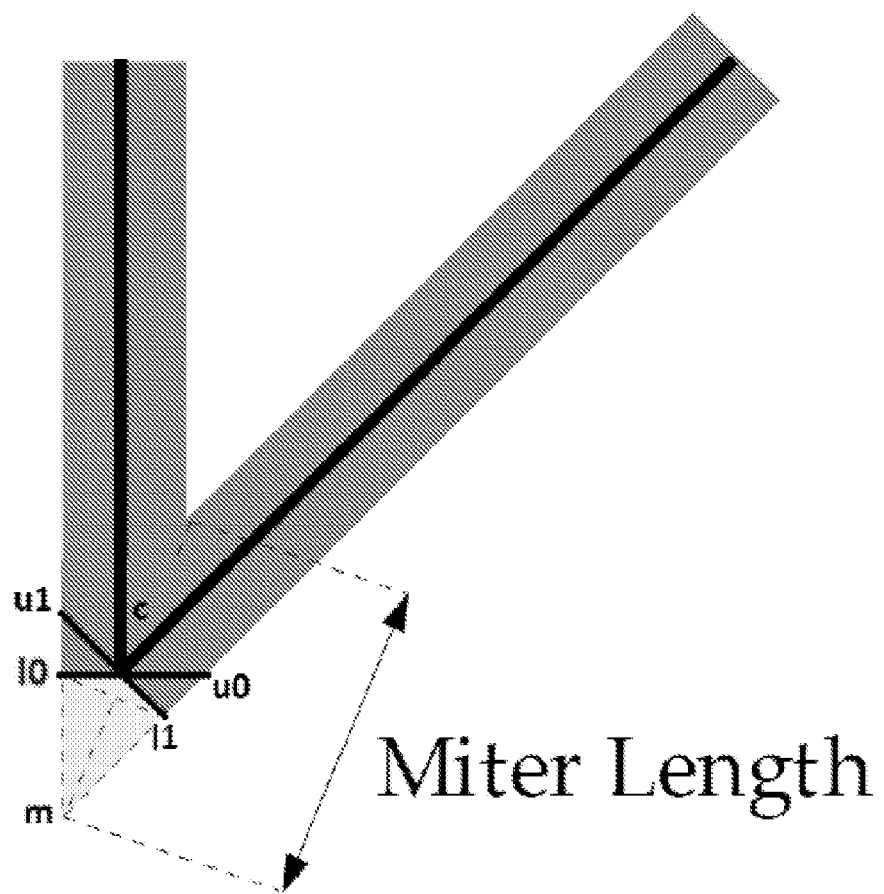
FIG. 9 is a conceptual diagram illustrating an example miter join.

FIG. 9 is a conceptual diagram illustrating an example miter join. For miter joins, GPU 12 may render one or more triangles that spatially correspond to the miter area. One of the triangles rendered for the miter join may be similar to the triangle rendered for the bevel join as described above with respect to FIG. 8. However, miter joins may have an additional triangle compared to the bevel join.

As shown in FIG. 9, point c may correspond to an endpoint of a path segment where two path segments meet, u0 and l0 may correspond to corner points generated based on the first path segment for the endpoint (i.e., c), and u1 and l1 may correspond to corner points generated based on the second path segment for the endpoint (i.e., c) Similar to the bevel join described above with respect to FIG. 8, domain shader 52 may receive data indicative of the join to be rendered from hull shader 48, generate a normal for each of the tangents associated with the join based on data indicative of the tangents received by domain shader 52, and provide one or more vertices that correspond to the join to be rendered to geometry shader 54 for further processing. The one or more vertices may include one or more attributes indicative of the common endpoint where two path segments meet (i.e., point c), one or more attributes indicative of the normals for each of the path segments at the common endpoint, and one or more attributes indicative of the type of path rendering primitive (e.g., a join in this case).

Geometry shader 54 may, in some examples, receive the one or more vertices from domain shader 52, and determine the corner points (u0, u1, l0, l1) for the endpoints of the path segments where the two path segments meet. In some examples, geometry shader 54 may determine the corner points (u0, u1, l0, l1) based on one or more of equations (15)-(18) as described in this disclosure.

To render a miter join, geometry shader 54 may determine two difference vectors according to the following equations:

$$v0=(u0-l0)/2 \quad (25)$$

$$v1=(u1-l1)/2 \quad (26)$$

where v0 and v1 correspond to the two difference vectors, u0 and u1 correspond to corner points generated based on a first path segment for an endpoint where two adjacent path segments meet (i.e., c), and l0 and l1 correspond to corner points generated based on a second path segment for the endpoint where the two adjacent path segments meet (i.e., c).

Geometry shader 54 may add the two difference vectors together to determine a center direction according to the following equation:

$$v=(v0+v1)/2 \quad (27)$$

where v corresponds to the center direction, and v0 and v1 correspond to the two difference vectors calculated in equations (25) and (26).

Geometry shader 54 may determine the miter length according to the following equation:

$$\text{miter length}=(\text{strokeWidth}*\text{strokeWidth})/(4*|v|) \quad (28)$$

where miter length corresponds to the length of the miter, and v corresponds to the center direction calculated in equation (27). As shown in FIG. 9, the miter length may correspond to the length between a first point and a second point. The first point may correspond to a point where the stroke areas for the path segments meet on first sides of the path segments. The second point may correspond to a point where the stroke areas for the path segments meet on second sides of the path segments opposite the first sides.

If the miter length is greater than the miter limit times the stroke width, then geometry shader 54 may replace the miter join with a bevel join. Otherwise, geometry shader 54 may determine the miter point according to the following equation:

$$m = c + v * \left( \frac{\text{strokeWidth}^2}{4*|v|^2} \right) \quad (29)$$

Where m corresponds to the miter point, v corresponds to the center direction calculated in equation (27), and c corresponds to the endpoint where the two adjacent path segments meet.

GPU 12 may render one or more triangles that spatially correspond to the miter area. In general, there are two possible sets of triangles that may correspond to the miter join area, {(c, l1, l0), (m, l0, l1)} and {(c, u0, u1), (m, u0, u1)}. FIG. 9 illustrates an example where the {(c, l1, l0), (m, l0, l1)} triangle set corresponds to the miter join area.

To avoid drawing an unnecessary triangles, geometry shader 54 may, in some examples, take the cross product of the difference vectors (u0-l0) and (u1-l1) and identify which set of triangles to draw based on the cross product of the difference vectors. In further examples, geometry shader 54 may take the cross product of the normals for each of the intersecting path segments at the endpoint where the two path segments meet (i.e., c), and identify which set of triangles to draw based on the cross product of the difference vectors. Geometry shader 54 may generate a triangle primitive for each triangle in the identified set triangle of triangles that corresponds to the miter area and pass the triangle primitives on to one or more subsequent stages of graphics pipeline 40 (e.g., rasterizer 56) such that GPU 12 renders the identified set of triangles.

In either of the above-mentioned examples, geometry shader 54 may determine which triangles to draw or render for the miter join based on the sign of the cross product. For example, if the sign of the cross product in either of the above examples is negative, then geometry shader 54 may determine to draw the triangles in the {(c, l1, l0), (m, l0, l1)} triangle set for the miter join and to not draw the triangles in the {(c, u0, u1), (m, u0, u1)} triangle set for the miter join. On the other hand, if the sign of the cross product in either of the above examples is positive, then geometry shader 54 may determine to draw the triangles in the {(c, u0, u1), (m, u0, u1)} triangle set for the miter join and to not draw the triangles in the {(c, l1, l0), (m, l0, l1)} triangle set for the miter join. In some examples, determining to draw a triangles in a particular triangle set may correspond to geometry shader 54 generating and outputting the triangles in the particular triangle set and determining not to draw triangles in a particular triangle set may correspond to geometry shader 54 not generating and/or not outputting triangles in the particular triangle set.

Graphics pipeline 40 may render the triangles generated by geometry shader 54 for the miter join area. Once the one or more triangles have been rendered, the render target (e.g., the frame buffer) may store a rasterized version of the stroke area for a miter join between the two path segments.

Figure 10:
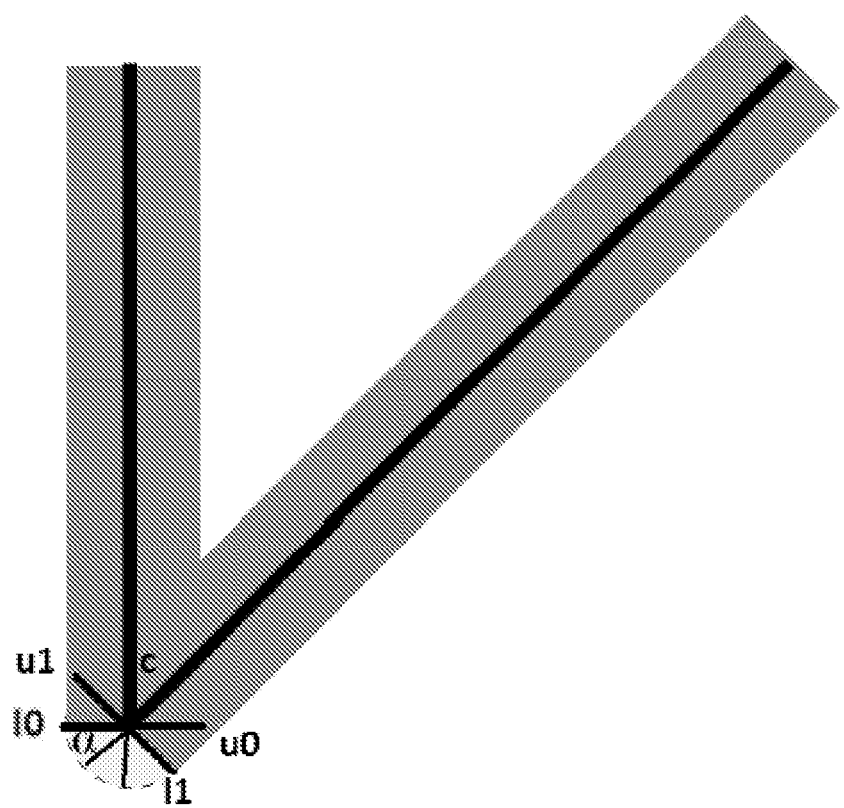
FIG. 10 is a conceptual diagram illustrating an example round join.

FIG. 10 is a conceptual diagram illustrating an example round join. As shown in FIG. 10, point c may correspond to an endpoint of a path segment where two path segments meet, u0 and l0 may correspond to corner points generated based on the first path segment for the endpoint (i.e., c), and u1 and l1 may correspond to corner points generated based on the second path segment for the endpoint (i.e., c). Described herein are two different techniques for rendering round joins.

According to a first technique for rendering round joins, graphics pipeline 40 may use tessellation stages 62 to generate a plurality of slice approximations for the round join area. Each slice approximation may correspond to a respective slice of the round join area where each slice is defined by the common endpoint (i.e., c) and two respective points along the curved edge of the round join. To approximate the slice, graphics pipeline 40 may use a line segment between the two respective points along the curved edge of the round join that are associated with the slice to approximate the curvature of the curved edge of the slice. To render the round join, in such examples, graphics pipeline 40 may render each of the slice approximations, which together may approximate the aggregate area of the round join.

To generate the slice approximations for a round join, tessellation stages 62 may generate a plurality of sets of two normal vectors where each set of two normal vectors may correspond to a respective one of the slices of the round join. The plurality of sets of normal vectors may include normal vectors that are interpolated between normal vectors associated with the point (i.e., c) where the two path segments meet. Each of the normal vectors may indicate the direction of one of the points along the curved edge of the round join relative to the common endpoint. Each slice approximation may be defined by the common endpoint (i.e., c) and two normal vectors. This is the same information that graphics pipeline 40 uses to render bevel join areas as discussed above with respect to FIG. 8. Thus, graphics pipeline 40 may render each slice approximation using the same techniques as those described above with respect to the bevel joins.

In addition to normalizing the tangents and/or converting the tangents from Cartesian coordinates to angular coordinates, as described above with respect to joins in general, for round joins, hull shader 48 may configure and cause tessellator 50 to generate a plurality of output values for evaluation by domain shader 52. For example, hull shader 48 may execute a patch constant function for each round join. The patch constant function may determine configuration parameters and provide such configuration parameters to tessellator 50 to be used by tessellator 50 when generating output values. For example, the patch constant function may cause hull shader 48 to provide tessellation factors to tessellator 50. The tessellation factors may specify a degree of tessellation that tessellator 50 is to apply to a particular tessellation domain (e.g., how finely the domain should be subdivided and/or the number of smaller objects into which the domain should be subdivided). In some examples, hull shader 48 may cause tessellator 50 to perform 4× tessellation for round joins. In some examples, hull shader 48 may specify an isoline tessellation domain and specify that tessellator 50 should subdivide the isoline domain into line segments.

Domain shader 52 may generate an output vertex for each output value received from tessellator 50. Each output vertex generated with respect to a particular round join may include the same position coordinates, which may correspond to the coordinates of the point where two path segments meet (i.e., point c). The coordinates for this point may be specified in the patch control list received from hull shader 48. The normal attributes for each output vertex generated for the join may be different. In some examples, domain shader 52 may generate the normal attributes for the round join using linear interpolation based on the two different angular coordinates for the two tangents included in the patch control list received from hull shader 48. For example, for each output value received from tessellator 50, domain shader 52 may evaluate one or more equations based on the output value received from tessellator 50 to determine the normal coordinates to output as attributes of a corresponding vertex.

In some examples, domain shader 52 may generate the normal coordinates based on one or more of the following equations:

$$\text{lerpedAngle} = (1-u)^* \text{firstAngle} + u^* \text{secondAngle} \quad (30)$$

$$\text{norm}.x = \cos(\text{lerpedAngle}) \quad (31)$$

$$\text{norm}.y = -\sin(\text{lerpedAngle}) \quad (32)$$

where firstAngle corresponds to an angular coordinate associated with a tangent for a first path segment associated with the join at the common point where the two path segments associated with the join meet, secondAngle corresponds to an angular coordinate associated with a tangent for a second path segment associated with the join at the common point where the two path segments associated with the join meet, u corresponds to an output value provided by tessellator 50, and (norm.x, norm.y) corresponds to the (x,y) normal coordinates that are generated by domain shader 52 for the vertex.

Geometry shader 54 may process each slice approximation in the same manner as that which was discussed above with respect to the bevel join except that the two path segment normals used to generate the bevel join may be replaced by the tessellated normals generated by tessellation stages 62. For example, for each slice approximation, geometry shader 54 may generate a triangle that spatially corresponds to the slice approximation. Graphics pipeline 40 may render the triangles for all of the slice approximations. Once all slice approximations have been rendered, the render target (e.g., the frame buffer) may store a rasterized version of the stroke area for a join between the two path segments.

As discussed above, round joins may be tessellated into a plurality of slices using the tessellation engine. By the time a slice of the round join reaches geometry shader 54, the slice may be treated just like a bevel-join and a single triangle may be rendered that approximates the area of the slice. In such examples, there may be a multitude of bevel-type joins generated for a round join, so there may be more than one geometry shader instance invoked for a round join.

Compared to the second technique described below for rendering joins, the first technique described above may allow the tessellation engine to be utilized, and may achieve a predictable and a lower vertex output count from a single geometry shader instance. This may improve the performance of the system when rendering joins compared to the second technique described in further detail below.

According to a second technique for rendering round joins, geometry shader 54 may divide the join section into pieces of angle α (shown in FIG. 10) and may approximate the divisions by triangles. The maximum angle that allows pixel accurate rendering may be predetermined for a given strokewidth. Geometry shader 54 may take the vertices found on a bevel join section, and keep applying a rotation matrix from one direction to generate the vertices of a triangle fan that approximates the area of the round join. Graphics pipeline 40 may render the triangle fan such that the render target (e.g., the frame buffer) stores a rasterized version of the stroke area for a join between two path segments.

Techniques are now described for rendering endcaps. Endcaps may be applied at the beginning and end of a path that is formed from a plurality of path segments. In some examples, there may be two different types of endcaps: (1) square caps; and (2) round caps. In some examples, the type of endcap to be rendered may be stored in a buffer in GPU 12 (e.g., a patch constant buffer), and CPU 6 may indicate the type of endcap to use for rendering by placing a value indicative of the type of endcap into the buffer.

An endcap may be formed at the beginning or end of a path segment that corresponds to the beginning or end of a path. To render an endcap, CPU 6 may place data indicative of the position of the endcap (e.g., the endpoint of a path segment) and data indicative of a tangent at that position into a buffer (e.g., a vertex buffer in path data 36) for consumption by GPU 12.

In some examples, the input path data for an endcap may take the following form or a similar form:

| { XMFLOAT3( | pos.x, | pos.y, 6.0f ) }, |
| { XMFLOAT3( | tan.x, | tan.y, 1.0f ) }, |
| { XMFLOAT3( | 0.0f, | 0.0f, 1.0f ) }, |
| { XMFLOAT3( | 0.0f, | 0.0f, 1.0f ) }, |

In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 6.0f, which means that the path segment is an endcap path segment. The type of endcap path segment (e.g., square or round) may be indicated by a value stored in a buffer (e.g., a patch constant buffer) of GPU 12. In this example, pos.x and pos.y are the (x, y) coordinates that correspond to the position or location where the endcap is formed (e.g., the endpoint of a path segment), and tan.x and tan.y are the (x, y) coordinates that correspond to a tangent for the path segment at the position or location where the endcap is formed. In some examples, CPU 6 may determine the coordinates for the tangent based on data indicative of the path segment on which the endcap is formed. The remaining vertices and attributes in this example may be unused and/or may be used to indicate other attributes for the cap.

In some examples, to render an endcap, hull shader 48 may convert the tangent (tan.x, tan.y) that corresponds to the endcap from Cartesian coordinates to angular coordinates. In further examples, hull shader 48 may normalize the tangent (tan.x, tan.y) that corresponds to the endcap prior to converting the Cartesian coordinates to angular coordinates. In additional examples, hull shader 48 may place the angular coordinates for the tangent into one or more attributes of the patch control list received by hull shader 48 and pass the modified patch control list to domain shader 52 for further processing. In some examples, hull shader 48 may implement the pseudo-code and/or shader program code discussed above with respect to joins to normalize the tangents and/or to convert the Cartesian coordinates for the tangents into angular coordinates.

As one specific example, an input patch control list received by hull shader 48 for an endcap may be as follows:

```
{ XMFLOAT3(   -0.4f,  0.8f,  6.0f ) } // location
{ XMFLOAT3(    0.8f,  0.0f,  1.0f ) } // tangent
{ XMFLOAT3(    0.0f,  0.0f,  1.0f ) }
{ XMFLOAT3(    0.0f,  0.0f,  1.0f ) }
```

In this example, hull shader 48 may generate an angular coordinate for the tangent, and place the angular coordinate in the third attribute of the control point that contains the tangent. The resulting patch control list may, in some examples, take the following form:

```
{ XMFLOAT3(   -0.4f,  0.8f,  6.0f ) }, // location
{ XMFLOAT3(    0.8f,  0.0f,  0.0f ) }, // tangent
{ XMFLOAT3(    0.0f,  0.0f,  1.0f ) },
{ XMFLOAT3(    0.0f,  0.0f,  1.0f ) },
```

Figure 11:
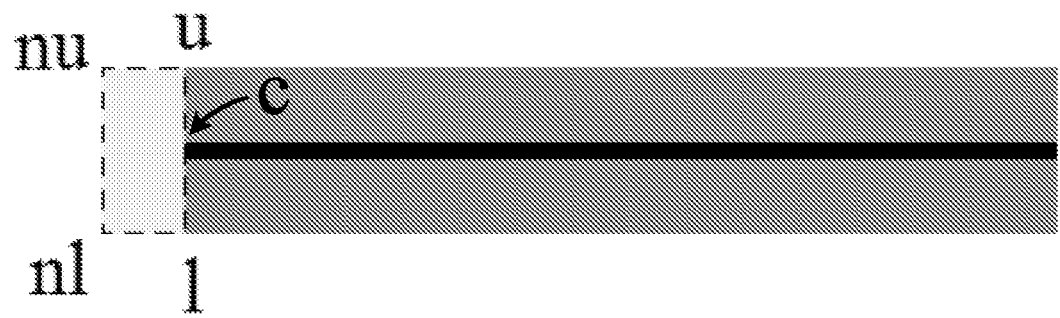
FIG. 11 is a conceptual diagram illustrating an example square cap.

FIG. 11 is a conceptual diagram illustrating an example square cap. For square caps, GPU 12 may render one or more triangles that spatially correspond to the cap area (e.g., the light-shaded rectangle shown in FIG. 11). As shown in FIG. 11, point c may correspond to an endpoint of a path segment, and u and l may correspond to corner points generated based on the endpoint (i.e., c) of the path segment at which the cap is formed.

In some examples, domain shader 52 may receive data indicative of a cap to be rendered from hull shader 48, generate one or more vertices that correspond to the cap to be rendered, and provide the vertices to geometry shader 54 for further processing. The data indicative of the cap to be rendered may include data indicative of the position or location where the cap is formed (e.g., the endpoint of a path segment), data indicative of a tangent for the path segment at the position or location where the cap is formed, and data indicative of the type of path rendering primitive (e.g., a cap in this case). In some examples, the data indicative of the cap to render may take the form of a patch control list (e.g., the patch control list specified above).

Domain shader 52 may generate a normal that corresponds to the tangent based on the data indicative of the tangent received by domain shader 52. For example, domain shader 52 may generate a normal for the tangent based on equation (14). The one or more vertices produced by domain shader 52 may include one or more attributes indicative of the endpoint of the path segment (i.e., point c) at which the cap is formed, one or more attributes indicative of a normal for the path segment at the endpoint (i.e., point c), and one or more attributes indicative of the type of path rendering primitive (e.g., a cap in this case).

Geometry shader 54 may, in some examples, receive one or more vertices from domain shader 52, and determine the corner points (u, l) for the endpoint of the path segment where the endcap is formed based on one or more of equations (15)-(18) as described in this disclosure. Geometry shader 54 may determine a vector v according to the following equation:

$$v=(u-l)/2 \quad (33)$$

where u and l correspond to corner points of a stroke area for an endpoint of a path segment.

Geometry shader 54 may rotate the vector, v, by 90 degrees to find a vector, n, according to the following equation:

$$n=(v.y,-v.x) \quad (34)$$

where a=(x, y) indicates the x and y components of the vector, a, where v.y corresponds the y-component of the vector v, and where v.x corresponds to the x-component of the vector v.

Geometry shader 54 may determine new points (e.g. vertices) for a starting cap or an ending cap according to the following equations:

$$nu=u\pm n \quad (35)$$

$$nl=l\pm n \quad (36)$$

where nu and nl are new corner points for the cap, and u and l correspond to corner points of a stroke area for an endpoint of a path segment.

Geometry shader 54 may generate one or more triangles for rendering the square cap that spatially correspond to the square cap area. For example, geometry shader 54 may generate two triangles (e.g., (u, l, nu) and (nu, l, nl)), that spatially correspond to the square cap area. Graphics pipeline 40 may render the one or more triangles generated by geometry shader 54 for the square cap area. Once the one or more triangles have been rendered, the render target (e.g., the frame buffer) may store a rasterized version of the stroke area for a square cap.

Figure 12:
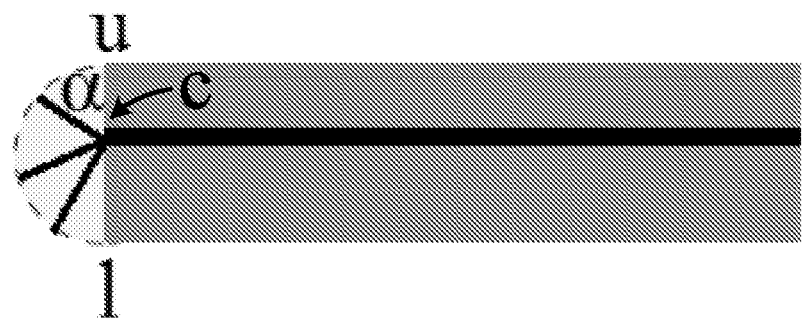
FIG. 12 is a conceptual diagram illustrating an example round cap.

FIG. 12 is a conceptual diagram illustrating an example round cap. As shown in FIG. 12, point c may correspond to an endpoint of a path segment, and u and l may correspond to corner points generated based on the endpoint (i.e., c) of the path segment at which the cap is formed. GPU 12 may render the round cap in a similar manner to either of the techniques described above for rendering round joins.

According to a first technique for rendering round caps, graphics pipeline 40 may use the tessellation stages 62 to generate a plurality of slice approximations for the round cap area. Each slice approximation may correspond to a respective slice of the round cap area where each slice is defined by the path endpoint (i.e., c) and two respective points along the curved edge of the round cap. To approximate the slice, graphics pipeline 40 may use a line segment between the two respective points along the curved edge of the round cap that are associated with the slice to approximate the curvature of the curved edge of the slice. To render the round cap, in such examples, graphics pipeline 40 may render each of the slice approximations, which together may approximate the aggregate area of the round cap.

To generate the slice approximations for a round cap, tessellation stages 62 may generate a plurality of sets of two normal vectors where each set of two normal vectors may correspond to a respective one of the slices of the round cap. The plurality of sets of normal vectors may include normal vectors that are interpolated between a normal vector associated with the endpoint of the path segment (i.e., c) where the round cap is formed and a vector that points in the opposite direction of the normal vector. Each of the normal vectors may indicate the direction of one of the points along the curved edge of the round cap relative to the common endpoint. Each slice approximation may be defined by the endpoint (i.e., c) where the round cap is formed and two normal vectors. This is the same information that graphics pipeline 40 uses to render bevel join areas as discussed above with respect to FIG. 8. Thus, graphics pipeline 40 may render each slice approximation using the same techniques as those described above with respect to the bevel joins.

In addition to normalizing the tangents and/or converting the tangents from Cartesian coordinates to angular coordinates, as described above with respect to caps in general, for round caps, hull shader 48 may configure and cause tessellator 50 to generate a plurality of output values for evaluation by domain shader 52. For example, hull shader 48 may execute a patch constant function for each round cap. The patch constant function may determine configuration parameters and provide such configuration parameters to tessellator 50 to be used by tessellator 50 when generating output values. The patch constant function may, for example, cause hull shader 48 to provide tessellation factors to tessellator 50. The tessellation factors may specify a degree of tessellation that tessellator 50 is to apply to a particular tessellation domain (e.g., how finely the domain should be subdivided and/or the number of smaller objects into which the domain should be subdivided). In some examples, hull shader 48 may cause tessellator 50 to perform 4× tessellation for round caps. In some examples, hull shader 48 may specify an isoline tessellation domain and specify that tessellator 50 should subdivide the isoline domain into line segments.

Domain shader 52 may generate an output vertex for each output value received from tessellator 50. Each output vertex generated with respect to a particular round cap may include the same position coordinates, which may correspond to the coordinates of the endpoint of the path segment at which the cap is formed (i.e., point c). The coordinates for this point may be specified in the patch control list received from hull shader 48. The normal attributes for each output vertex generated for the round cap may be different. In some examples, domain shader 52 may generate the normal attributes for the round join using linear interpolation. The linear interpolation may be based on the angular coordinate for the tangent included in the patch control list received from hull shader 48 and based on an angular coordinate derived by adding pi (e.g., 180 degrees) to the angular coordinate for the tangent included in the patch control list received from hull shader 48. For each output value received from tessellator 50, domain shader 52 may evaluate one or more equations based on the output value received from tessellator 50 to determine the normal coordinates to output as attributes of a corresponding vertex.

In some examples, domain shader 52 may generate the normal coordinates based on one or more of the following equations:

$$\text{lerpedAngle}=(1-u)*\text{angle}+u*(\text{angle}+PI) \quad (37)$$

$$\text{norm}.x=\cos(\text{lerpedAngle}) \quad (38)$$

$$\text{norm}.y=-\sin(\text{lerpedAngle}) \quad (39)$$

where angle corresponds to an angular coordinate associated with a tangent for the path segment at an endpoint of the path segment at which the round cap is formed, u corresponds to an output value provided by tessellator 50, and (norm.x, norm.y) corresponds to the (x,y) normal coordinates that are generated by domain shader 52 for the endpoint of the path segment.

Geometry shader 54 may process each slice approximation in the same manner as that which was discussed above with respect to the bevel join except that the two path segment normals used to generate the bevel join may be replaced by the tessellated normals generated by tessellation stages 62. For example, for each slice approximation, geometry shader 54 may generate a triangle that spatially corresponds to the slice approximation. Graphics pipeline 40 may render the triangles for all of the slice approximations. Once all slice approximations have been rendered, the render target (e.g., the frame buffer) may store a rasterized version of the stroke area for a round cap.

As discussed above, round caps may be tessellated into a plurality of slices by using the tessellation engine. By the time a slice of the round cap reaches geometry shader 54, the slice may be treated just like a bevel-join and a single triangle may be rendered that approximates the area of the slice. In such examples, there may be a multitude of bevel-type joins generated from a round cap, so there may be more than one geometry shader instance invoked for a round cap.

Compared to the second technique described below for rendering caps, the first technique described above may allow the tessellation engine to be utilized, and may achieve a predictable and a lower vertex output count from a single geometry shader instance. This may improve the performance of the system when rendering caps compared to the second technique described in further detail below.

According to a second technique for rendering round caps, geometry shader 54 may divide the cap section into pieces of angle α and approximate the divisions by triangles. The maximum angle that allows pixel accurate rendering may be predetermined for the current strokewidth. Geometry shader 54 may take the vertices found on a bevel join section, may keep applying a rotation matrix to one of the u or l vertices, and may create a triangle fan that approximates the area of the round cap. Graphics pipeline 40 may render the triangle fan such that the render target (e.g., the frame buffer) stores a rasterized version of the stroke area for the round cap.

The techniques described above for rendering joins and endcaps were generically described above as being performed by geometry shader 54. In some examples, all or part of the above-described techniques may be performed in one or more fixed-function and/or programmable shader processing stages of GPU 12 in addition to or in lieu of geometry shader 54. Rasterizer 56 and the pixel processing pipeline stages may also be used to render the triangles that correspond to the join and endcap areas.

FIGS. 13-16 illustrate techniques for performing GPU-accelerated path rendering according to this disclosure. The techniques shown in FIGS. 13-16 are described as being performed by GPU 12 shown in FIGS. 1 & 2 and with graphics pipeline 40 shown in FIG. 3 for exemplary purposes. In other examples, the techniques illustrated in FIGS. 13-16 may be implemented in other systems that have same or different components in the same or a different configuration.

Figure 13:
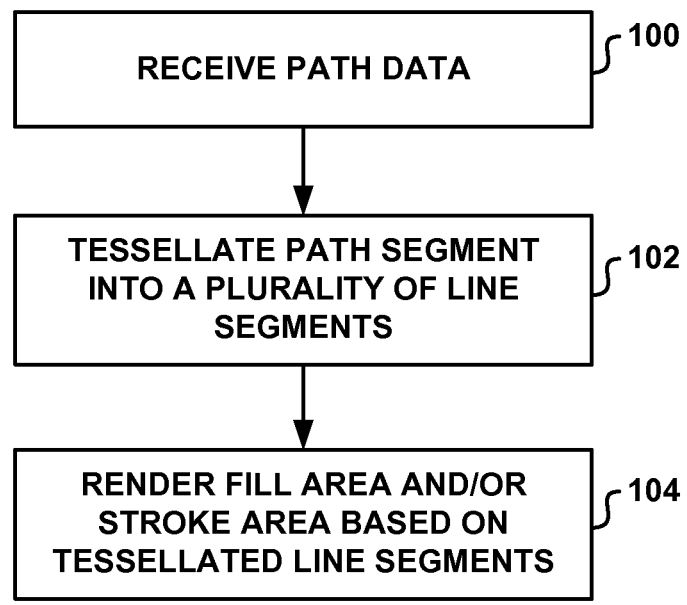
FIG. 13 is a flow diagram illustrating an example technique for performing GPU-accelerated path rendering according to this disclosure.

FIG. 13 is a flow diagram illustrating an example technique for performing GPU-accelerated path rendering according to this disclosure. GPU 12 receives path data (100). The path data may be indicative of one or more path segments of a path to be rendered. In some examples, the path data may geometrically define the path segment to be rendered (e.g., may provide one or more parameters for one or more mathematical equations that geometrically define the path segment to be rendered).

GPU 12 tessellates a path segment defined by the path data into a plurality of line segments (102). In some examples, tessellation stages 62 of GPU 12 may be used to perform the tessellation. GPU 12 renders at least one of a fill area and a stroke area for the path segment based on the plurality of line segments (104). In some examples, GPU 12 may render both a fill area and a stroke area for the path segment based on the plurality of line segments.

The example technique shown in FIG. 13 generates tessellated line segments to perform GPU-accelerated path rendering. In other examples, other types of tessellated primitives may be generated to perform the GPU-accelerated path rendering, such as, e.g., tessellated points or vertices.

Figure 14:
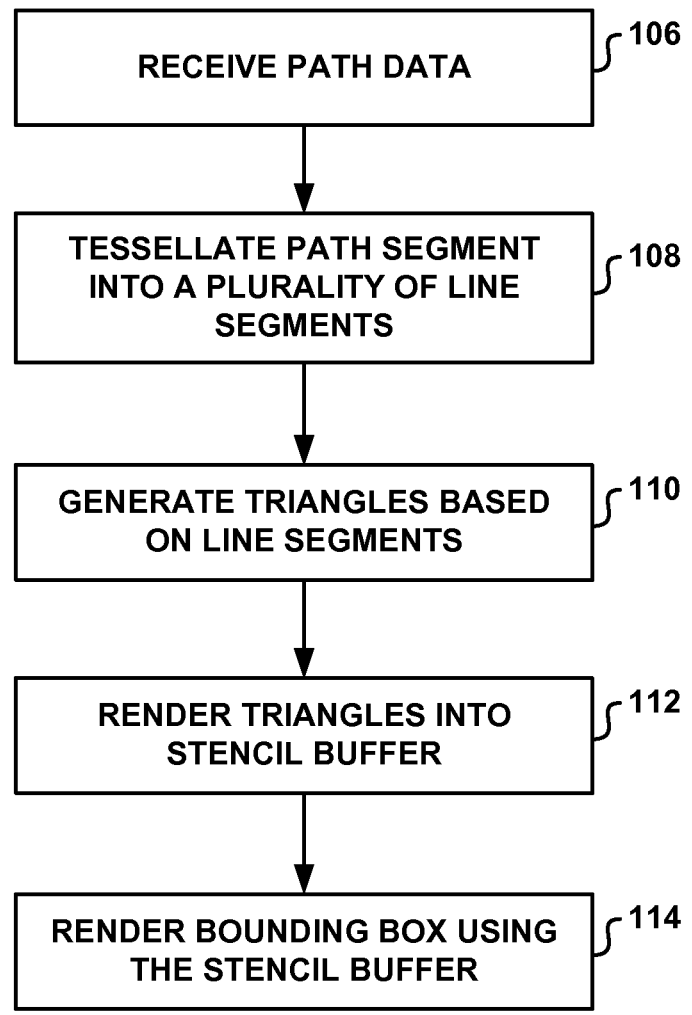
FIG. 14 is a flow diagram illustrating an example technique for performing a path filling operation according to this disclosure.

FIG. 14 is a flow diagram illustrating an example technique for performing a filling operation according to this disclosure. In some examples, the technique illustrated in FIG. 14 may be used to perform the technique illustrated in FIG. 13 (e.g., rendering a fill area for the path segment).

GPU 12 receives path data (106). The path data may be indicative of one or more path segments of a path to be rendered. GPU 12 tessellates a path segment defined by the path data into a plurality of line segments (108).

GPU 12 generates a plurality of triangle primitives based on the plurality of line segments (110). Each of the plurality of triangle primitives may be generated based on a respective one of the plurality of line segments. Each of the plurality of triangle primitives for a given path segment may share a common vertex. The other two vertices for each of the triangle primitives may correspond to the endpoints of a respective one of the plurality of line segments.

GPU 12 renders each of the plurality of triangle primitives into a common stencil buffer (112). After rendering all of the triangle primitives into the stencil buffer, the stencil buffer may store data indicative of which pixels are inside of the fill area for the path segment. To render each of the plurality of triangle primitives into a common stencil buffer, GPU 12 may use one of the following techniques. According to a first technique, GPU 12 may, for each of the plurality of triangle primitives, invert one or more values in the stencil buffer that correspond to the respective triangle primitive. According to a second technique, GPU 12 may, for each of the plurality of triangle primitives, increment one or more values in the stencil buffer that correspond to the respective triangle primitive if a vertex order for the respective triangle primitive is oriented in a clockwise direction, and decrement values in the stencil buffer that correspond to the respective triangle primitive if a vertex order for the respective triangle primitive is oriented in a counter-clockwise direction.

GPU 12 renders one or more primitives corresponding to a bounding box for the fill area using the stencil buffer (114). For example, GPU 12 may render one or more primitives that encompass the pixels that are inside of the fill area based on the data stored in the stencil buffer and a fill color to generate a rasterized version of the fill area for the path segment. The bounding box may encompass the pixels that are inside of the fill area for the path segment to be rendered. In some examples, the bounding box may be formed from two triangle primitives that encompass the pixels that are inside of the fill area for the path segment to be rendered. The data in the stencil buffer may cause pixels inside of the fill area to light up with a fill color (specified by CPU 6 prior to the second rendering pass), and cause pixels that are outside of the fill area to remain dark. Once the rendering of the bounding box has completed, the render target (e.g., the frame buffer) may store a rasterized version of the fill area for the path segment.

In some examples, process box 108 may be performed using tessellation stages 62 of GPU 12 (e.g., hull shader 48, tessellator 50 and/or domain shader 52 of GPU 12). In further examples, process box 110 may be performed using geometry shader 54 of GPU 12.

Figure 15:
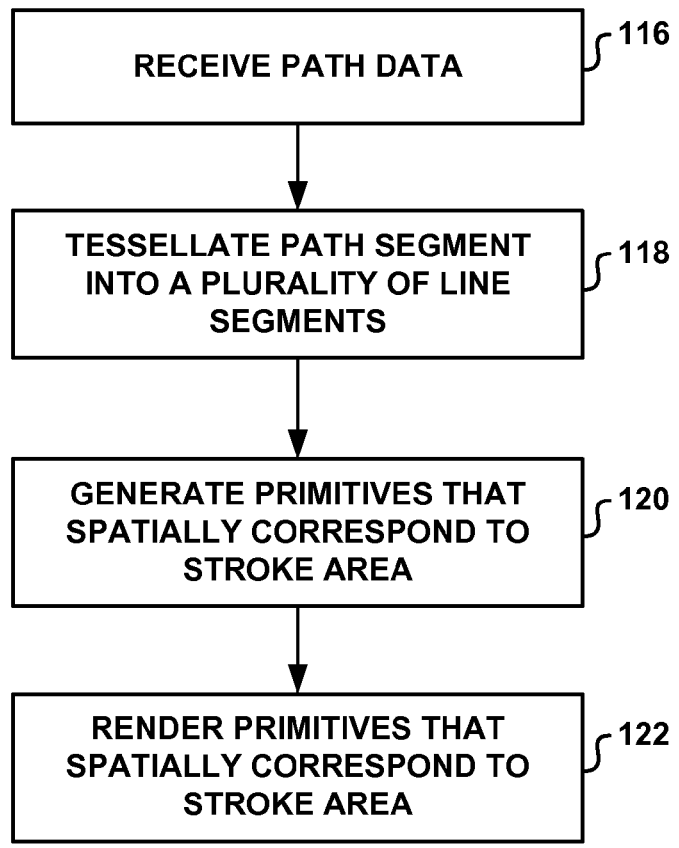
FIG. 15 is a flow diagram illustrating an example technique for performing a path stroking operation according to this disclosure.

FIG. 15 is a flow diagram illustrating an example technique for performing a stroking operation according to this disclosure. In some examples, the technique illustrated in FIG. 15 may be used to perform the technique illustrated in FIG. 13 (e.g., rendering a stroke area for the path segment).

GPU 12 receives path data (116). The path data may be indicative of one or more path segments of a path to be rendered. GPU 12 tessellates a path segment defined by the path data into a plurality of line segments (118).

GPU 12 generates a plurality of primitives that spatially corresponds to the stroke area for the path segment (120). For example, for each of the plurality of tessellated line segments, GPU 12 may generate one or more primitives that spatially correspond to a stroke area for the respective line segment.

GPU 12 renders primitives that spatially correspond to the stroke area for the path segment (122). For example, for each of the plurality of tessellated line segments, GPU 12 may render one or more primitives for a respective line segment based on a stroke color to generate a rasterized version of the stroke area for the path segment. Once the rendering of the primitives is complete, the render target (e.g., the frame buffer) may store a rasterized version of the stroke area for the path segment.

In some examples, process box 118 may be performed using tessellation stages 62 of GPU 12 (e.g., hull shader 48, tessellator 50 and/or domain shader 52 of GPU 12). In further examples, process box 120 may be performed using geometry shader 54 of GPU 12.

Figure 16:
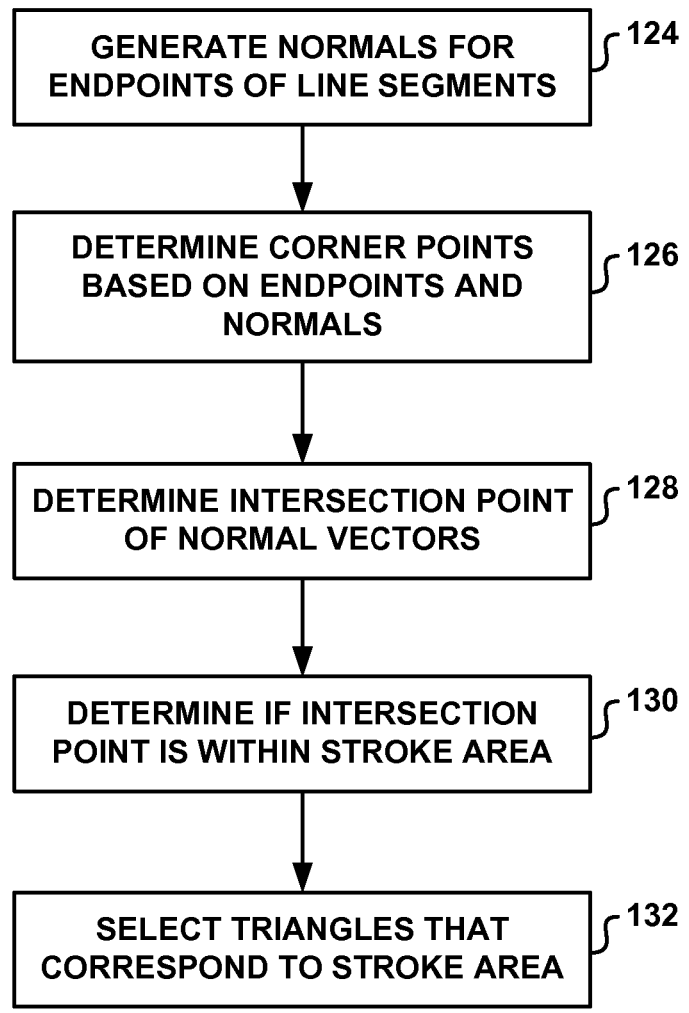
FIG. 16 is a flow diagram illustrating an example technique for generating a set of primitives that spatially correspond to a stroke area of a path segment according to this disclosure.

FIG. 16 is a flow diagram illustrating an example technique for generating a set of primitives that spatially correspond to a stroke area of a path segment according to this disclosure. In some examples, the technique illustrated in FIG. 16 may be used to perform process box 120 illustrated in FIG. 13.

For each of the tessellated line segments, GPU 12 generates a plurality of normal vectors for the respective line segment (124). Each of the normal vectors may be indicative of a tangent of the path segment at a respective one of a plurality of points along the path segment. In some examples, a tangent of the path segment at a respective one of a plurality of points along the path segment may correspond to a tangent of the path segment that intersects the path segment at the respective one of the plurality of points along the path segment. Each of the plurality of points along the path segment may correspond to a respective one of the endpoints of the respective line segment. In some cases, each of the normal vectors may have a unit length. In further cases, each of the normal vectors may be represented as a set of normal coordinates which define the direction of the normal vector with respect to an origin. In some examples, GPU 12 may determine the normal vectors based on one or more of equations (9)-(14) as described in this disclosure.

For each of the tessellated line segments, GPU 12 determines a set of corner points that correspond to a stroke area for the respective line segment based on the plurality of normal vectors and a stroke width (126). In some examples, the set of corner points may correspond to points u0, u1, l0, and l1 shown in FIGS. 5 and 6. In further examples, GPU 12 may determine the set of corner points based on one or more of equations (15)-(18) as described in this disclosure.

For each of the tessellated line segments, GPU 12 may generate one or more primitives that spatially correspond to the stroke area for the respective line segment based on the corner points of the stroke area. For example, GPU 12 may determine the intersection point of the normal vectors (128), determine if the intersection point is within the stroke area for the respective line segment (130), and select triangles that correspond to the stroke area for the respective tessellated line segment based on the corner points, the intersection point, and the determination of whether the intersection point is within the stroke area for the respective line segment (132). The intersection point may alternatively be referred to herein as a center point (i.e., c).

In some examples, GPU 12 may determine the intersection point based on one or more of equations (19)-(24) as described in this disclosure. In further examples, GPU 12 may determine whether the intersection point is within the stroke area for the respective line segment based on whether strokewidth<min(u0c,u1c) as described above in this disclosure.

In additional examples, GPU 12 may select triangles that correspond to the stroke area for the respective tessellated line segment based on the following technique. If the intersection point is outside of the stroke area (e.g., FIG. 5), then GPU 12 may generate two triangles to form a quad that spatially corresponds to the stroke area. For example, GPU 12 may generate two triangles using the following combinations of vertices {u0, u1, l1} and {l1, l0, u0}.

If the intersection point is inside of the stroke area (e.g., FIG. 6), then GPU 12 may generate two triangles to form a butterfly that spatially corresponds to the stroke area. For example, GPU 12 may generate two triangles using the following combinations of vertices {u0, u1, c} and {c, l0, l1} if the {u0, u1, c} triangle is oriented in a clockwise direction, and generate two triangles using the following combinations of vertices {u0, u1, c} and {c, l1, l0} if the {u0, u1, c} triangle is oriented in a counter-clockwise direction.

Figure 17:
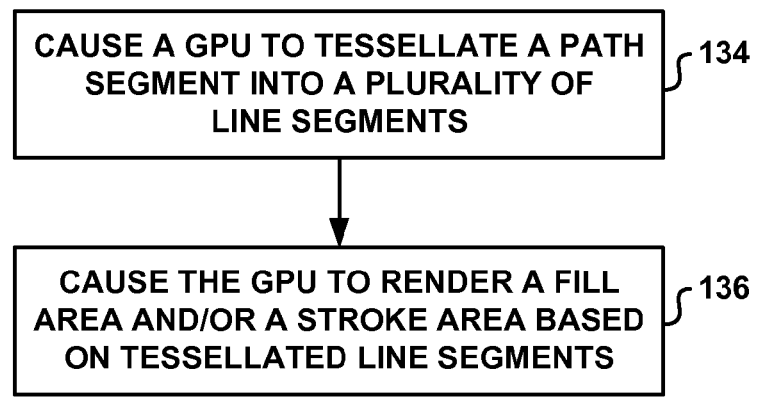
FIG. 17 is a flow diagram illustrating an example technique for causing a GPU to perform GPU-accelerated path rendering according to this disclosure.

FIG. 17 is a flow diagram illustrating an example technique for causing a GPU to perform GPU-accelerated path rendering according to this disclosure. The technique shown in FIG. 17 is described as being performed by CPU 6 shown in FIGS. 1 & 2 for exemplary purposes. In other examples, the technique illustrated in FIG. 17 may be implemented in other systems that have same or different components in the same or a different configuration.

CPU 6 (e.g., software application 24 and/or GPU driver 28) causes GPU 12 to tessellate a path segment into a plurality of line segments (134). In some examples, in order to cause GPU 12 to tessellate a path segment into a plurality of line segments, CPU 6 may load one or both of a hull shader program and a domain shader program onto GPU 12, and cause the one or both of the hull shader program and the domain shader program to tessellate a path segment into a plurality of line segments in conjunction with an on-chip tessellation engine. The one or both of the hull shader program and the domain shader program may be configured to perform one or more of the techniques attributed to such programs in this disclosure. In some examples, CPU 6 may cause the one or both of the hull shader program and the domain shader program to tessellate a path segment into a plurality of line segments by placing data indicative of a path segment into one or more vertex buffers, and issuing a draw call with on-chip tessellation enabled.

CPU 6 (e.g., software application 24 and/or GPU driver 28) causes GPU 12 to render a fill area and/or a stroke area based on tessellated line segments (136). To cause GPU 12 to render a fill area based on tessellated line segments, CPU 6 may, in some examples, cause GPU 12 to generate a plurality of triangle primitives based on the plurality of line segments. Each of the plurality of triangle primitives may be generated based on a respective one of the plurality of line segments. In such examples, CPU 6 may cause GPU 12 to render each of the plurality of triangle primitives into a common stencil buffer such that the common stencil buffer stores data indicative of which pixels are inside of the fill area for the path segment, and to render one or more primitives that encompass the pixels that are inside of the fill area based on the data stored in the stencil buffer and a fill color to generate a rasterized version of the fill area for the path segment.

In some examples, in order to cause GPU 12 to generate a plurality of triangle primitives based on the plurality of line segments, CPU 6 may load a geometry shader program onto GPU 12, and cause the geometry shader program to generate a plurality of triangle primitives based on the plurality of line segments. The geometry shader program may be configured to perform one or more of the techniques attributed to the geometry shader program in this disclosure. In some examples, CPU 6 may cause the geometry shader program to generate the plurality of triangle primitives by placing data indicative of a path segment into one or more vertex buffers, and issuing a draw call with the geometry shader enabled.

In some examples, in order to cause GPU 12 to generate a plurality of triangle primitives based on the plurality of line segments, CPU 6 may cause GPU 12 to, for each of the plurality of triangle primitives, increment one or more values in the stencil buffer that correspond to the respective triangle primitive if a vertex order for the respective triangle primitive is oriented in a clockwise direction. In such examples, CPU 6 may cause GPU 12 to, for each of the plurality of triangle primitives, decrement one or more values in the stencil buffer that correspond to the respective triangle primitive if the vertex order for the respective triangle primitive is oriented in a counter-clockwise direction. In further examples, in order to cause GPU 12 to generate a plurality of triangle primitives based on the plurality of line segments, CPU 6 may cause GPU 12 to, for each of the plurality of line segments, invert one or more values in the stencil buffer that correspond to the respective triangle primitive.

To cause GPU 12 to render a stroke area based on tessellated line segments, CPU 6 may, in some examples, cause GPU 12 to, for each of the plurality of line segments, generate one or more primitives that spatially correspond to a stroke area for the respective line segment, and for each of the plurality of line segments, render the one or more primitives for the respective line segment based on a stroke color to generate a rasterized version of the stroke area for the path segment.

In some examples, in order to cause GPU 12 to generate the one or more primitives that spatially correspond to the stroke area for the respective line segment, CPU 6 may load a geometry shader program onto GPU 12, and cause the geometry shader program to generate a plurality of triangle primitives based on the plurality of line segments. The geometry shader program may be configured to perform one or more of the techniques attributed to the geometry shader program in this disclosure. In some examples, CPU 6 may cause the geometry shader program to generate the plurality of triangle primitives by placing data indicative of a path segment into one or more vertex buffers, and issuing a draw call with the geometry shader enabled.

In some examples, in order to cause GPU 12 to generate the one or more primitives that spatially correspond to the stroke area for the respective line segment, CPU 6 may cause domain shader 52 in GPU 12 to generate a plurality of normal vectors for a respective line segment. Each of the normal vectors may be indicative of a direction that is perpendicular to a tangent of the path segment at a respective one of a plurality of points along the path segment. Each of the plurality of points along the path segment may correspond to a respective one of the endpoints of the respective line segment. In such examples, CPU 6 may, in some examples, cause geometry shader 54 in GPU 12 to determine the corner points of a stroke area for the respective line segment based on the plurality of normal vectors and a stroke width, and to generate one or more primitives that spatially correspond to the stroke area for the respective line segment based on the corner points of the stroke area.

In some examples, the techniques of this disclosure may be used to perform path rendering on DirectX® GPUs. In further examples, the techniques of this disclosure may be implemented and tested on an OpenVG™ platform and/or may conform to OpenVG™ path rendering standards. In additional examples, the techniques of this disclosure may provide a GPU accelerated solution to path rendering for DirectX® versions 9.3, 11 and 11+. DirectX® 11+ may refer to a modified DirectX® 11 architecture.

In some examples, a path may refer to a plurality of path segments, which may be, e.g., a line, an elliptic arc, a quadratic Bézier curve and a cubic Bézier curve. A path may be either "closed" or not (i.e., open). A closed path may refer to a path where the last vertex is connected to the first vertex via a line and where the path forms a closed shape. An open path may refer to path where the last vertex does not necessarily connect to the first vertex. A path may overlap itself numerous times. Path rendering may be divided into two main tasks: Filling and Stroking.

Filling a path may refer to filling the interior region of a given path by the fill color. The interior region may be defined using, e.g., either even/odd fill rules or non-zero fill rules. In some examples, the techniques of this disclosure may provide a two-pass approach that uses the VS/HS/DS/GS (i.e., vertex shader/hull shader/domain shader/geometry shader) on the first pass, and the VS/PS (i.e. vertex shader/pixel shader) on the second pass. The first pass may generate fill information in the stencil buffer, and the second pass may cover the stencil area in order to render the fill area for the path onto the frame buffer. In some examples, the two-pass approach may be implemented in a DirectX® 11 (DX11) graphics pipeline without, in some examples, any substantial modifications to the DX11 pipeline architecture.

In some examples, the path filling operation may be performed as follows:
1. Pass 1: Tessellate the path into line segments
2. Pass 1: Create a triangle in every GS instance by connecting the pivot point to line segments and render the triangles to the stencil buffer
3. Pass 2: Render the bounding box area with stencil test enabled.

In some examples, tessellating the path into line segments may involve using a four (4) control point patch list as the input format for path segments as described earlier in this disclosure. In further examples, tessellating the path into line segments may involve evaluating paths using domain shader 52 as described earlier in this disclosure. In additional examples, tessellating the path into line segments may involve finding an ellipse center for elliptic arc as described earlier in this disclosure.

In some examples, creating a triangle in every GS instance by connecting the pivot point to line segments and then rendering the triangles to the stencil buffer may involve, after the line segments are produced in the DS, using the GS to connect the predetermined pivot point to every line segment to create triangles. Rasterizer 56 may then rasterize these triangles onto the stencil buffer, where front facing triangles increase the stencil result and back face triangles decrease the stencil result.

In some examples, rendering the bounding box area with stencil test enabled may involve passing down two triangles covering the bounding box area of the path with stencil test enabled to light up the pixels that fall into the path fill.

Stroking a path may refer to "widening" the edges of the path using a straight-line pen held perpendicularly to the path. In some examples, the techniques of this disclosure may tessellate and evaluate the path, and at each evaluated point, widen the point according to the normal at that point and create triangulation to form segments. The union of all segments may form the stroke line (e.g., the stroke area for the line).

In some examples, the techniques of this disclosure may provide a single pass approach that uses VS/HS/DS (i.e., vertex shader/hull shader/domain shader) to tessellate lines, and that uses a GS (i.e., geometry shader) to fatten the lines by the stroking width. Joins and endcaps may go through the same pipeline and be handled in the GS. The resulting triangles may then be rasterized in the same rendering pass. In some examples, the single pass approach may be implemented in a DirectX 11® (DX11) graphics pipeline without, in some examples, any substantial modifications to the DX11 pipeline architecture.

In some examples, the stroking operation may be performed as follows:
1. Tessellate the path into line segments (Bypass for join/endcap)
2. Fatten the line segments and create triangulation
3. Render triangles with depth testing enabled In some examples, tessellating the path into line segments may involve using a four (4) control point patch list as the input format for path segments as described earlier in this disclosure. In further examples, tessellating the path into line segments may involve evaluating paths using domain shader 52 as described earlier in this disclosure. In additional examples, tessellating the path into line segments may involve finding an ellipse center for elliptic arc as described earlier in this disclosure.

In some examples, fattening the line segments and creating the triangulation may involve, after the line segments are produced, using the GS to fatten every line segment by shifting the endpoints in positive and negative normal directions in the GS. The GS may then generate the triangulation of the stroke area. Joins and caps may also be handled in the GS.

In some examples, rendering the triangles with depth test enabled may involve rendering the triangle stream from the GS with depth testing enabled in order to handle overlapping portions correctly. In some examples, the stencil buffer may be used in lieu of depth buffer to mimic the depth testing functionality without allocating separate stencil and depth buffers.

Table 1 illustrates a comparison of the techniques of this disclosure implemented in different generations of DirectX® graphics pipelines. It should be noted that the properties listed in Table 1 for the techniques of this disclosure do not necessarily apply to all examples of the techniques described herein.

TABLE 1

Comparison of implementation of example techniques of this disclosure for different generations of DirectX® graphics pipelines.

| Product | Features | | | |
|---|---|---|---|---|
| | Dashes/ cusps | Data to memory | Multi-pass | Notes |
| DirectX® 9.3 with Compute Shader | No | yes | yes | Slow performance because of data to memory. |
| DirectX® 11 | No | no | yes | |
| DirectX® 11+ | Yes | no | no | Hardware changes needed. |

Described below are possible combinations of algorithms that may be used to perform path rendering on a DirectX® 11 level or later graphics pipeline.

The filling operation may be represented as:
VS→HS→DS→GS→VS→PS (2 pass).
The first pass may utilize the VS/HS/DS/GS, and may tessellate the path pieces into line segments, create a triangle in every GS instance by connecting the pivot point to line segments, and render the triangles to the stencil buffer. The second pass may utilize the VS/PS, and may render the bounding box area with stencil test enabled.

The stoking operation may be represented as:
VS→HS→DS→GS→PS (1 pass).
The stroking operation may be a single pass operation that utilizes VS/HS/DS/GS/PS, and may tessellate the path pieces into line segments, fatten the line segments or do the join/endcap, and create triangulation in GS instances, and render the triangles with depth test enabled.

In some examples, joins and caps may form part of the GPU input, and may be packed into a vertex buffer as part of the path data. In such examples, a CPU may find endpoint tangents of path segments, which may correspond to control point differences for curves and lines. For ellipses, the CPU may convert the ellipse into parametric form first then find endpoint tangents.

In some examples, the techniques of this disclosure may require little or no CPU involvement and/or data manipulation. In additional examples, the techniques of this disclosure may not necessarily implement re-tessellation/cusps and dashes. In additional examples, the total number of rendering passes may be modeled as 2*PF+PS.

Path rendering may include two stages called filling a closed path and stroking the path. A path may include one or more of the three: a line, a quadratic/cubic Bézier curve, or an elliptic arc. Although many CPU implementations exist to render paths, and some (e.g., implemented by NVidia) may use a CPU/GPU hybrid implementation. Rendering the paths on the CPU may be a wasteful approach that does not exploit the parallel nature of the problem. CPU/GPU hybrid implementations may suffer from the performance loss due to device communication.

In some examples, the techniques of this disclosure provide an approach to path rendering that is a DirectX® 11 based 100% GPU rendering solution, where dashing is disabled and the paths do not have cusps or zero tangents. Over 95% of real life scenarios typically do not have cusps or zero tangents. Using the GPU, rendering time and power consumption may be significantly decreased. If dashing is needed, additional CPU operations may be used for handling the dashing between two rendering passes.

In some examples, the techniques of this disclosure may allow users of DirectX® 11 hardware to perform path rendering using DirectX® 11 hardware or with hardware that has similar performance characteristics. In further examples, the techniques of this disclosure may provide an all-GPU rendering solution to path rendering.

Although the techniques of this disclosure have been primarily described with respect to a hardware architecture that is defined by the DX 11 graphics API, the techniques of this disclosure may also be performed in hardware architectures defined according to other on-chip, tessellation-enabled graphics APIs such as, e.g., the OpenGL® graphics API (e.g., OpenGL® versions 4.0, 4.1, 4.2, 4.3 and later versions). In examples where the techniques of this disclosure are implemented in a hardware architecture defined according to the OpenGL® graphics API, one or more of the functions attributed to hull shader 48 in this disclosure may be performed by a tessellation control shader and/or one or more of the functions attributed to domain shader 52 in this disclosure may be performed by a tessellation evaluation shader.

Further details regarding the general operation of the OpenGL® graphics pipeline may be found in "The OpenGL® Graphics System: A Specification (Version 4.3 (Core Profile)—Aug. 6, 2012)," Aug. 6, 2012, The Khronos Group, Inc. available at http://www.opengl.org/registry/doc/glspec43.core.20120806.pdf, the entire content of which is incorporated herein by reference.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
   receiving, with a graphics processing unit (GPU), data indicative of a first path segment of a first path to be rendered and a second path segment of a second path to be rendered, the first path segment and the second path segment comprising respective two-dimensional vector graphics paths;
   tessellating, with the GPU, the first path segment into a first plurality of primitives and the second path segment into a second plurality of primitives;
   rendering, with the GPU, a fill area for the first path segment based on the first plurality of primitives, wherein the first plurality of primitives comprises a first plurality of line segments, and wherein rendering the fill area comprises:
      generating, with the GPU, a first plurality of triangle primitives based on the first plurality of line segments, each of the first plurality of triangle primitives being generated based on a respective one of the first plurality of line segments;
      rendering, with the GPU, each of the first plurality of triangle primitives into a common stencil buffer such that the common stencil buffer stores data indicative of which pixels are inside of the fill area for the first path segment; and
      rendering, with the GPU, one or more first primitives that encompass the pixels that are inside of the fill area based on the data stored in the common stencil buffer and a fill color to generate a rasterized version of the fill area for the first path segment; and
   rendering, with the GPU, a stroke area for the second path segment based on the second plurality of primitives comprises a second plurality of line segments, and wherein rendering the stroke area comprises:
      fattening, with a geometry shader of the GPU, the second plurality of line segments by shifting endpoints of the second plurality of line segments in positive and negative normal directions;
      generating, with the geometry shader of the GPU, a triangulation of the stroke area creating a second plurality of triangle primitives; and
      rendering, with the GPU, the second plurality of triangle primitives, wherein rendering comprises correcting overlapping portions of rendered second plurality of triangle primitives using a depth test, and the depth test configured to use data stored in the common stencil buffer without allocating a separate depth buffer.

2. The method of claim 1,
   wherein tessellating the first path segment comprises tessellating the first path segment using a fixed-function tessellation engine of the GPU and a domain shader program executing on a shader unit of the GPU, and
   wherein generating the first plurality of triangle primitives comprises generating the first plurality of triangle primitives using a geometry shader program executing on a shader unit of the GPU.

3. The method of claim 2, wherein generating the first plurality of triangle primitives comprises generating the first plurality of triangle primitives such that each of the first plurality of triangle primitives has a common vertex and two vertices that correspond to endpoints of a respective one of the first plurality of line segments.

4. The method of claim 3, wherein rendering each of the first plurality of triangle primitives into the common stencil buffer comprises:
   for each of the first plurality of triangle primitives, inverting one or more values in the stencil buffer that correspond to the respective triangle primitive.

5. The method of claim 3, wherein rendering each of the first plurality of triangle primitives into the common stencil buffer comprises:
   for each of the first plurality of triangle primitives, incrementing one or more values in the common stencil buffer that correspond to the respective triangle primitive if a vertex order for the respective triangle primitive is oriented in a clockwise direction; and
   for each of the first plurality of triangle primitives, decrementing one or more values in the common stencil buffer that correspond to the respective triangle primitive if the vertex order for the respective triangle primitive is oriented in a counter-clockwise direction.

6. The method of claim 1, wherein rendering the stroke area comprises:
   for each of the second plurality of line segments, generating, with the GPU, one or more second primitives that spatially correspond to a stroke area for a respective line segment of the second plurality of line segments; and for each of the second plurality of line segments, rendering, with the GPU, the one or more primitives for the respective line segment of the second plurality of line segments based on a stroke color to generate a rasterized version of the stroke area for the second path segment.

7. The method of claim 6, further comprising:
tessellating the second path segment using a fixed-function tessellation engine of the GPU and a domain shader program executing on a shader unit of the GPU,
wherein generating the second one or more primitives comprises generating the one or more second primitives using a geometry shader program executing on a shader unit of the GPU.

8. The method of claim 6, wherein fattening the second plurality of line segments comprises:
generating a plurality of normal vectors for the respective line segment, each of the normal vectors being indicative of a direction that is perpendicular to a tangent of the path segment at a respective one of a plurality of points along the path segment, each of the plurality of points along the path segment corresponding to a respective one of the endpoints of the respective line segment;
determining corner points of a stroke area for the respective line segment based on the plurality of normal vectors and a stroke width; and
generating the one or more primitives that spatially correspond to the stroke area for the respective line segment based on the corner points of the stroke area.

9. The method of claim 1, wherein tessellating the first path segment into the first plurality of primitives and the second path segment into a second plurality of primitives comprises determining a center of an ellipse of the first path segment or the second path segment when the first path segment or the second path segment comprises an elliptic arc.

10. The method of claim 1, wherein rendering the stroke area for the second path segment further comprises:
generating, by the geometry shader with the GPU, a join or an endcap on an end of the second path segment.

11. A device comprising:
a memory;
a graphics processing unit (GPU) configured to receive data from the memory indicative of a first path segment of a first path to be rendered and a second path segment of a second path to be rendered, the first path segment and the second path segment comprising respective two-dimensional vector graphics paths, tessellate the first path segment into a first plurality of primitives and the second path segment into a second plurality of primitives, render a fill area for the first path segment based on the first plurality of primitives, wherein the first plurality of primitives comprises a first plurality of line segments, and wherein the GPU is further configured to:
generate a plurality of first triangle primitives based on the first plurality of line segments, each of the first plurality of triangle primitives being generated based on a respective one of the first plurality of line segments;
render each of the first plurality of triangle primitives into a common stencil buffer such that the common stencil buffer stores data indicative of which pixels are inside of the fill area for the first path segment;
render one or more first primitives that encompass the pixels that are inside of the fill area based on the data stored in the common stencil buffer and a fill color to generate a rasterized version of the fill area for the path segment;
render a stroke area for the second path segment based on the second plurality of primitives comprises a second plurality of line segments, wherein the GPU is further configured to:
fatten the second plurality of line segments by shifting endpoints of the second plurality of line segments in positive and negative normal directions;
generate a triangulation of the stroke area creating a second plurality of triangle primitives; and
render the second plurality of triangle primitives, wherein the GPU is further configured to correct overlapping portions of rendered second plurality of triangle primitives using a depth test, and the depth test configured to use data stored in the common stencil buffer without allocating a separate depth buffer.

12. The device of claim 11, wherein the GPU is further configured to:
tessellate the first path segment using a fixed-function tessellation engine of the GPU and a domain shader program executing on a shader unit of the GPU; and
generate the first plurality of triangle primitives using a geometry shader program executing on a shader unit of the GPU.

13. The device of claim 12, wherein the GPU is further configured to generate the first plurality of triangle primitives such that each of the first plurality of triangle primitives has a common vertex and two vertices that correspond to endpoints of a respective one of the first plurality of line segments.

14. The device of claim 13, wherein the GPU is further configured to, for each of the first plurality of triangle primitives, invert one or more values in the common stencil buffer that correspond to the respective triangle primitive.

15. The device of claim 13, wherein the GPU is further configured to:
for each of the first plurality of triangle primitives, increment one or more values in the common stencil buffer that correspond to the respective triangle primitive if a vertex order for the respective triangle primitive is oriented in a clockwise direction; and
for each of the first plurality of triangle primitives, decrement one or more values in the common stencil buffer that correspond to the respective triangle primitive if the vertex order for the respective triangle primitive is oriented in a counter-clockwise direction.

16. The device of claim 11, wherein the GPU is further configured to:
for each of the second plurality of line segments, generate one or more second primitives that spatially correspond to a stroke area for a respective line segment of the second plurality of line segments; and
for each of the second plurality of line segments, render the one or more primitives for the respective line segment of the second plurality of line segments based on a stroke color to generate a rasterized version of the stroke area for the second path segment.

17. The device of claim 16, wherein the GPU is further configured to:
tessellate the second path segment using a fixed-function tessellation engine of the GPU and a domain shader program executing on a shader unit of the GPU; and
generate the second one or more primitives using a geometry shader program executing on a shader unit of the GPU.

18. The device of claim 16, wherein the GPU is further configured to:
- generate a plurality of normal vectors for the respective line segment, each of the normal vectors being indicative of a direction that is perpendicular to a tangent of the path segment at a respective one of a plurality of points along the path segment, each of the plurality of points along the path segment corresponding to a respective one of the endpoints of the respective line segment;
- determine corner points of a stroke area for the respective line segment based on the plurality of normal vectors and a stroke width; and
- generate the one or more primitives that spatially correspond to the stroke area for the respective line segment based on the corner points of the stroke area.

19. The device of claim 11, wherein the device comprises a wireless communication device.

20. The device of claim 11, wherein the device comprises a mobile phone handset.

21. An apparatus comprising:
- means for receiving data indicative of a first path segment of a first path to be rendered and a second path segment of a second path, the first path segment and the second path segment comprising respective two-dimensional vector graphics paths;
- means for tessellating the first path segment into a first plurality of primitives and the second path segment into a second plurality of primitives; and
- means for rendering of a fill area for the first path segment based on the first plurality of primitives, wherein the first plurality of primitives comprises a first plurality of line segments, and wherein rendering the fill area comprises:
- means for generating a first plurality of triangle primitives based on the first plurality of line segments, each of the first plurality of triangle primitives being generated based on a respective one of the first plurality of line segments;
- means for rendering each of the first plurality of triangle primitives into a common stencil buffer such that the common stencil buffer stores data indicative of which pixels are inside of the fill area for the first path segment;
- means for rendering one or more first primitives that encompass the pixels that are inside of the fill area based on the data stored in the common stencil buffer and a fill color to generate a rasterized version of the fill area for the first path segment;
- means for rendering, with the GPU, a stroke area for the second path segment based on the second plurality of primitives comprises a second plurality of line segments;
- means for fattening the second plurality of line segments by shifting endpoints of the second plurality of line segments in positive and negative normal directions;
- means for generating a triangulation of the stroke area creating a second plurality of triangle primitives; and
- means for rendering, with the GPU, the second plurality of triangle primitives, wherein the means for rendering comprises a means for correcting overlapping portions of rendered second plurality of triangle primitives using a depth test, and the depth test configured to use data stored in the common stencil buffer without allocating a separate depth buffer.

22. The apparatus of claim 21,
- wherein the means for tessellating the first path segment comprises means for tessellating the first path segment using a fixed-function tessellation engine of a graphics processing unit (GPU) and a domain shader program executing on a shader unit of the GPU, and
- wherein the means for generating the plurality of triangle primitives comprises means for generating the first plurality of triangle primitives using a geometry shader program executing on a shader unit of the GPU.

23. The apparatus of claim 22, wherein the means for generating the first plurality of triangle primitives comprises means for generating the first plurality of triangle primitives such that each of the first plurality of triangle primitives has a common vertex and two vertices that correspond to endpoints of a respective one of the first plurality of line segments.

24. The apparatus of claim 23, wherein the means for rendering each of the first plurality of triangle primitives into the common stencil buffer comprises:
- means for, for each of the first plurality of triangle primitives, inverting one or more values in the common stencil buffer that correspond to the respective triangle primitive.

25. The apparatus of claim 23, wherein the means for rendering each of the first plurality of triangle primitives into the common stencil buffer comprises:
- means for incrementing, for each of the first plurality of triangle primitives, one or more values in the common stencil buffer that correspond to the respective triangle primitive if a vertex order for the respective triangle primitive is oriented in a clockwise direction; and
- means for decrementing, for each of the first plurality of triangle primitives, one or more values in the common stencil buffer that correspond to the respective triangle primitive if the vertex order for the respective triangle primitive is oriented in a counter-clockwise direction.

26. The apparatus of claim 21, wherein the means for rendering the stroke area comprises:
- means for generating, for each of the second plurality of line segments, one or more second primitives that spatially correspond to a stroke area for a respective line segment of the second plurality of line segments; and
- means for rendering, for each of the second plurality of line segments, the one or more primitives for the respective line segment of the second plurality of line segments based on a stroke color to generate a rasterized version of the stroke area for the second path segment.

27. The apparatus of claim 26,
- wherein the means for tessellating the second path segment comprises means for tessellating the second path segment using a fixed-function tessellation engine of a graphics processing unit (GPU) and a domain shader program executing on a shader unit of the GPU, and
- wherein the means for generating the second one or more primitives comprises means for generating the second one or more primitives using a geometry shader program executing on a shader unit of the GPU.

28. The apparatus of claim 26, wherein the means for fattening the second plurality of line segments comprises:
- means for generating a plurality of normal vectors for the respective line segment, each of the normal vectors being indicative of a direction that is perpendicular to a tangent of the path segment at a respective one of a plurality of points along the path segment, each of the plurality of points along the path segment corresponding to a respective one of the endpoints of the respective line segment;

means for determining corner points of a stroke area for the respective line segment based on the plurality of normal vectors and a stroke width; and means for generating the one or more primitives that spatially correspond to the stroke area for the respective line segment based on the corner points of the stroke area.

29. A non-transitory computer readable storage medium storing instructions that upon execution by one or more graphics processors cause the one or more graphics processors to:

receive data indicative of a first path segment of a first path to be rendered and a second path segment of a second path, the first path segment and the second path segment comprising respective two-dimensional vector graphics paths;

tessellate the first path segment into a first plurality of primitives and the second path segment into a second plurality of primitives; and render a fill area for the first path segment based on the first plurality of primitives, wherein the first plurality of primitives comprises a first plurality of line segments, and wherein the instructions that upon execution by the one or more graphics processors cause the one or more graphics processors to render the fill area comprise instructions that upon execution by the one or more graphics processors cause the one or more graphics processors to:

generate a first plurality of triangle primitives based on the first plurality of line segments, each of the first plurality of triangle primitives being generated based on a respective one of the first plurality of line segments;

render each of the first plurality of triangle primitives into a common stencil buffer such that the common stencil buffer stores data indicative of which pixels are inside of the fill area for the first path segment; and render one or more first primitives that encompass the pixels that are inside of the fill area based on the data stored in the common stencil buffer and a fill color to generate a rasterized version of the fill area for the first path segment;

render a stroke area for the second path segment based on the second plurality of primitives comprises a second plurality of line segments, and wherein the instructions that upon execution by the one or more graphics processors cause the one or more graphics processors to render the stroke area comprise instructions that upon execution by the one or more graphics processors cause the one or more graphics processors to:

fatten the second plurality of line segments by shifting endpoints of the second plurality of line segments in positive and negative normal directions;

generate a triangulation of the stroke area creating a second plurality of triangle primitives; and render the second plurality of triangle primitives, wherein the GPU is further configured to correct overlapping portions of rendered second plurality of triangle primitives using a depth test, and the depth test configured to use data stored in the common stencil buffer without allocating a separate depth buffer.

30. The non-transitory computer readable storage medium of claim 29, wherein the instructions that upon execution by the one or more processors cause the one or more processors to tessellate the first path segment comprise instructions that upon execution by the one or more graphics processors cause the one or more graphics processors to tessellate the first path segment using a fixed-function tessellation engine of a graphics processing unit (GPU) and a domain shader program executing on a shader unit of the GPU, and wherein the instructions that upon execution by the one or more graphics processors cause the one or more graphics processors to generate the first plurality of triangle primitives comprise instructions that upon execution by the one or more graphics processors cause the one or more processors to generate the first plurality of triangle primitives using a geometry shader program executing on a shader unit of the GPU.

31. The non-transitory computer readable storage medium of claim 30, wherein the instructions that upon execution by the one or more graphics processors cause the one or more graphics processors to generate the first plurality of triangle primitives comprise instructions that upon execution by the one or more graphics processors cause the one or more graphics processors to generate the first plurality of triangle primitives such that each of the first plurality of triangle primitives has a common vertex and two vertices that correspond to endpoints of a respective one of the plurality of line segments.

32. The non-transitory computer readable storage medium of claim 31, wherein the instructions that upon execution by the one or more graphics processors cause the one or more graphics processors to render each of the first plurality of triangle primitives into the common stencil buffer comprise instructions that upon execution by the one or more graphics processors cause the one or more graphics processors to:

for each of the first plurality of triangle primitives, invert one or more values in the common stencil buffer that correspond to the respective triangle primitive.

33. The non-transitory computer readable storage medium of claim 31, wherein the instructions that upon execution by the one or more graphics processors cause the one or more processors to render each of the first plurality of triangle primitives into the common stencil buffer comprise instructions that upon execution by the one or more graphics processors cause the one or more graphics processors to:

for each of the first plurality of triangle primitives, increment one or more values in the common stencil buffer that correspond to the respective triangle primitive if a vertex order for the respective triangle primitive is oriented in a clockwise direction; and for each of the first plurality of triangle primitives, decrement one or more values in the common stencil buffer that correspond to the respective triangle primitive if the vertex order for the respective triangle primitive is oriented in a counter-clockwise direction.

34. The non-transitory computer readable storage medium of claim 29, wherein the instructions that upon execution by the one or more graphics processors cause the one or more graphics processors to render the stroke area comprise instructions that upon execution by the one or more processors cause the one or more graphics processors to:

for each of the second plurality of line segments, generate one or more second primitives that spatially correspond to a stroke area for a respective line segment of the second plurality of line segments; and for each of the second plurality of line segments, render the one or more primitives for the respective line segment of the second plurality of line segments based on a stroke color to generate a rasterized version of the stroke area for the second path segment.

35. The non-transitory computer readable storage medium of claim 34,
    wherein the instructions that upon execution by the one or more graphics processors cause the one or more graphics processors to tessellate the second path segment using a fixed-function tessellation engine of a graphics processing unit (GPU) and a domain shader program executing on a shader unit of the GPU, and
    wherein the instructions that upon execution by the one or more graphics processors cause the one or more graphics processors to generate the one or more second primitives comprise instructions that upon execution by the one or more graphics processors cause the one or more graphics processors to generate the one or more second primitives using a geometry shader program executing on a shader unit of the GPU.

36. The non-transitory computer readable storage medium of claim 34, wherein the instructions that upon execution by the one or more graphics processors cause the one or more graphics processors to fatten the second plurality of line segments comprise instructions that upon execution by the one or more graphics processors cause the one or more graphics processors to:
    generate a plurality of normal vectors for the respective line segment, each of the normal vectors being indicative of a direction that is perpendicular to a tangent of the path segment at a respective one of a plurality of points along the path segment, each of the plurality of points along the path segment corresponding to a respective one of the endpoints of the respective line segment;
    determine corner points of a stroke area for the respective line segment based on the plurality of normal vectors and a stroke width; and
    generate the one or more primitives that spatially correspond to the stroke area for the respective line segment based on the corner points of the stroke area.

* * * * *